(12) United States Patent
Durney

(10) Patent No.: US 8,505,258 B2
(45) Date of Patent: Aug. 13, 2013

(54) LOAD-BEARING THREE-DIMENSIONAL STRUCTURE

(75) Inventor: Max W. Durney, San Francisco, CA (US)

(73) Assignee: Industrial Origami, Inc., Middleburg Heights, OH (US)

(*) Notice: Subject to any disclaimer, the term of this patent is extended or adjusted under 35 U.S.C. 154(b) by 304 days.

(21) Appl. No.: 12/028,713

(22) Filed: Feb. 8, 2008

(65) Prior Publication Data

US 2008/0187427 A1    Aug. 7, 2008

Related U.S. Application Data

(60) Continuation-in-part of application No. 11/411,440, filed on Apr. 25, 2006, now Pat. No. 7,464,574, which is a division of application No. 10/861,726, filed on Jun. 4, 2004, now Pat. No. 7,032,426, which is a division of application No. 10/672,766, filed on Sep. 26, 2003, now Pat. No. 7,152,449, which is a continuation-in-part of application No. 10/256,870, filed on Sep. 26, 2002, now Pat. No. 6,877,349, which is a continuation-in-part of application No. 09/640,267, filed on Aug. 17, 2000, now Pat. No. 6,481,259, said application No. 12/028,713 is a continuation-in-part of application No. 11/180,398, filed on Jul. 12, 2005, now abandoned, and a continuation-in-part of application No. 10/672,766, filed on Sep. 26, 2003, now Pat. No. 7,152,449, said application No. 12/028,713 is a continuation-in-part of application No. 11/384,216, filed on Mar. 16, 2006, now Pat. No. 7,534,501, and a continuation-in-part of application No. 10/672,766, filed on Sep. 26, 2003, now Pat. No. 7,152,449, said application No. 12/028,713 is a continuation-in-part of application No. 10/952,357, filed on Sep. 27, 2004, now Pat. No. 7,374,810, which is a division of application No. 10/256,870, filed on Sep. 26, 2002, now Pat. No. 6,877,349, said application No. 12/028,713 is a continuation-in-part of application No. 11/842,932, filed on Aug. 21, 2007, now Pat. No. 7,560,155, which is a division of application No. 10/931,615, filed on Aug. 31, 2004, now Pat. No. 7,263,869, which is a continuation-in-part of application No. 10/795,077, filed on Mar. 3, 2004, now Pat. No. 7,152,450, which is a continuation-in-part of application No. 10/672,766, filed on Sep. 26, 2004, now Pat. No. 7,152,449.

(60) Provisional application No. 60/889,262, filed on Feb. 9, 2007, provisional application No. 60/587,470, filed on Jul. 12, 2004, provisional application No. 60/663,392, filed on Mar. 17, 2005.

(51) Int. Cl.
*B21D 28/00* (2006.01)

(52) U.S. Cl.
USPC ............ 52/648.1; 52/658; 493/399; 493/352; 493/356; 72/379.2; 72/335

(58) Field of Classification Search
USPC ............ 248/251, 262, DIG. 9, 300; 312/334, 312/335, 342–343, 348, 330 R; 72/379.2, 72/335; 52/800.1, 800.11, 800.12, 800.17, 52/801.1, 649.3, 656.1, 668, 658, 648.1, 52/745.19; 428/596–597; 414/722–723, 414/800; 493/395–399, 352, 356, 363
See application file for complete search history.

(56) References Cited

U.S. PATENT DOCUMENTS

| | | |
|---|---|---|
| 387,651 A | 8/1888 | Maxim |
| 624,144 A | 5/1899 | Wilmot |
| 649,387 A | 5/1900 | Wright et al. |
| 649,762 A | 5/1900 | Saltzkorn et al. |
| 800,365 A | 9/1905 | Ebert |
| 975,121 A | 11/1910 | Carter |
| 1,295,769 A | 2/1919 | Kux |
| 1,405,042 A | 1/1922 | Kraft |
| 1,468,271 A | 9/1923 | Bechtel |
| 1,557,066 A | 10/1925 | Krantz |
| 1,698,891 A | 1/1929 | Overbury |
| 1,699,693 A | 1/1929 | Eisenhauer |

| Patent | Date | Name |
|---|---|---|
| 1,810,842 A | 9/1929 | Moecker, Jr. |
| 1,746,429 A | 2/1930 | Kelleweay |
| 2,127,618 A | 8/1938 | Riemenschneider |
| 2,158,972 A | 5/1939 | Weindel, Jr. Fred |
| 2,339,355 A | 1/1944 | Rutten |
| 2,423,863 A | 7/1947 | Wales |
| 2,480,034 A | 8/1949 | Lapp |
| 2,484,398 A | 10/1949 | Bell et al. |
| 2,512,118 A | 7/1950 | Snow |
| 2,515,067 A | 7/1950 | Wright et al. |
| 2,560,786 A | 7/1951 | Wright et al. |
| 2,577,588 A * | 12/1951 | Paige .......................... 229/117 |
| 2,625,290 A | 1/1953 | Kice et al. |
| 2,638,643 A * | 5/1953 | Olson ........................ 428/577 |
| 2,771,851 A | 11/1956 | McGregor |
| 2,825,407 A | 3/1958 | Widell |
| 2,869,694 A | 1/1959 | Breckheimer |
| 2,880,032 A | 3/1959 | Bareenyl |
| 2,882,990 A * | 4/1959 | Mustoe ........................ 181/284 |
| 2,901,155 A | 8/1959 | Vines |
| 2,916,181 A | 12/1959 | Pfister et al. |
| 2,926,831 A | 3/1960 | Strange |
| 2,947,436 A * | 8/1960 | Kappen ........................ 220/1.5 |
| 2,948,624 A * | 8/1960 | Watson et al. ................ 426/111 |
| 2,976,747 A | 3/1961 | Schatzschock et al. |
| 3,039,414 A | 6/1962 | Rosanes |
| 3,090,087 A | 5/1963 | Miller |
| 3,094,158 A | 6/1963 | Reid |
| 3,094,229 A | 6/1963 | Johnson et al. |
| 3,095,134 A * | 6/1963 | Jacke ........................ 229/5.82 |
| 3,107,041 A * | 10/1963 | Wagner, Jr ............... 229/117.17 |
| 3,107,807 A | 10/1963 | Bergh et al. |
| 3,120,257 A | 2/1964 | Webers et al. |
| 3,129,524 A * | 4/1964 | Hayslett ........................ 40/750 |
| 3,135,527 A * | 6/1964 | Knapp ........................ 280/654 |
| 3,156,232 A | 11/1964 | Pollock et al. |
| 3,159,156 A | 12/1964 | Incledon |
| 3,191,564 A | 6/1965 | Fraze |
| 3,204,849 A * | 9/1965 | Vinney ........................ 229/210 |
| 3,205,600 A * | 9/1965 | Snyder ........................ 40/716 |
| 3,216,644 A * | 11/1965 | Harrison et al. ............. 229/119 |
| 3,217,437 A * | 11/1965 | Cobb ........................ 40/604 |
| 3,228,710 A | 1/1966 | Chodorowski |
| 3,234,704 A * | 2/1966 | Burgess et al. ................ 52/839 |
| 3,246,796 A | 4/1966 | Englander et al. |
| 3,258,380 A | 6/1966 | Fischer et al. |
| 3,313,080 A | 4/1967 | Gewiss |
| 3,318,301 A | 5/1967 | Schibley |
| 3,341,395 A | 9/1967 | Weber |
| 3,353,639 A | 11/1967 | Andriussi |
| 3,357,078 A | 12/1967 | Moltchan |
| 3,361,320 A | 1/1968 | Bobrowski |
| 3,455,018 A | 7/1969 | Collins |
| 3,474,225 A | 10/1969 | Leedy |
| 3,521,536 A | 7/1970 | Waldbauer et al. |
| 3,538,982 A | 11/1970 | Fiori |
| 3,590,759 A | 7/1971 | Hendrie, Jr. et al. |
| 3,626,604 A | 12/1971 | Pierce |
| 3,638,465 A | 2/1972 | Lickliter et al. |
| 3,638,597 A | 2/1972 | Brown |
| 3,666,607 A | 5/1972 | Weissman |
| 3,688,385 A | 9/1972 | Brown |
| 3,717,022 A | 2/1973 | DuBois |
| 3,731,514 A | 5/1973 | Deibele, Jr. |
| 3,756,499 A | 9/1973 | Giebel et al. |
| 3,774,434 A | 11/1973 | Bock |
| 3,776,015 A | 12/1973 | Chartet et al. |
| 3,779,282 A | 12/1973 | Klees |
| 3,788,934 A | 1/1974 | Coppa |
| 3,851,912 A | 12/1974 | Grosseau |
| 3,854,859 A | 12/1974 | Sola |
| 3,862,562 A | 1/1975 | Kruger |
| 3,867,829 A | 2/1975 | Bock |
| 3,878,438 A | 4/1975 | Weisman |
| 3,879,240 A | 4/1975 | Wall |
| 3,882,653 A | 5/1975 | Ollman |
| 3,890,869 A | 6/1975 | Van Cleave |
| 3,907,193 A | 9/1975 | Heller |
| 3,914,974 A | 10/1975 | De Vore |
| 3,938,657 A | 2/1976 | David |
| 3,943,744 A | 3/1976 | Marsh et al. |
| 3,952,574 A | 4/1976 | Speidel |
| 3,963,170 A | 6/1976 | Wood |
| 3,994,275 A | 11/1976 | Williams |
| 4,004,334 A | 1/1977 | Greenley |
| 4,011,704 A | 3/1977 | O'Konski |
| 4,027,340 A | 6/1977 | Hadtke |
| 4,058,813 A | 11/1977 | Risko |
| 4,102,525 A | 7/1978 | Albano |
| 4,120,084 A | 10/1978 | Wallman |
| 4,132,026 A | 1/1979 | Dodds |
| 4,133,198 A | 1/1979 | Huda et al. |
| 4,133,336 A | 1/1979 | Smith |
| 4,141,525 A * | 2/1979 | Miller .......................... 248/251 |
| 4,145,801 A | 3/1979 | Schrecker et al. |
| 4,166,565 A | 9/1979 | Webinger |
| 4,170,691 A | 10/1979 | Rogers |
| 4,190,190 A | 2/1980 | Halonen |
| 4,215,194 A | 7/1980 | Shepherd |
| 4,230,058 A | 10/1980 | Iwaki et al. |
| 4,245,615 A | 1/1981 | Moss |
| 4,289,290 A * | 9/1981 | Miller .......................... 248/251 |
| 4,305,340 A * | 12/1981 | Iwaki et al. ................. 72/379.4 |
| 4,327,835 A | 5/1982 | Leger |
| 4,352,843 A | 10/1982 | Eckert |
| 4,362,519 A | 12/1982 | Gault |
| 4,383,430 A | 5/1983 | Klaus |
| 4,401,341 A | 8/1983 | Hirabayashi et al. |
| 4,421,232 A | 12/1983 | Konaka |
| 4,428,599 A | 1/1984 | Jahnle |
| 4,457,555 A | 7/1984 | Draper |
| 4,468,946 A | 9/1984 | Driear |
| 4,469,273 A | 9/1984 | Smith |
| 4,469,727 A | 9/1984 | Loew |
| 4,479,737 A | 10/1984 | Bergh et al. |
| 4,489,976 A | 12/1984 | Flaherty |
| 4,491,362 A | 1/1985 | Kennedy |
| 4,510,785 A | 4/1985 | Triouleyre et al. |
| 4,515,004 A | 5/1985 | Jaenson |
| 4,542,933 A | 9/1985 | Bischoff |
| 4,557,132 A | 12/1985 | Break |
| 4,558,582 A | 12/1985 | Meinig |
| 4,559,259 A | 12/1985 | Cetrelli |
| 4,596,356 A | 6/1986 | Chaussadas |
| 4,597,374 A | 7/1986 | Igarashi |
| 4,628,661 A * | 12/1986 | St. Louis ........................ 52/658 |
| 4,645,701 A | 2/1987 | Zarrow |
| 4,650,217 A | 3/1987 | Ehrlund |
| 4,672,718 A | 6/1987 | Schlueter et al. |
| 4,676,545 A | 6/1987 | Bonfilio et al. |
| 4,735,077 A | 4/1988 | Döring et al. |
| 4,760,634 A | 8/1988 | Rapp et al. |
| 4,792,082 A | 12/1988 | Williamson |
| 4,792,085 A | 12/1988 | Waring, III et al. |
| 4,803,879 A | 2/1989 | Crawford |
| 4,819,792 A | 4/1989 | Christian |
| 4,831,711 A | 5/1989 | Rapp |
| 4,837,066 A | 6/1989 | Quinn et al. |
| 4,869,539 A | 9/1989 | Cassese |
| 4,887,862 A | 12/1989 | Bassi |
| 4,898,326 A | 2/1990 | Edwards et al. |
| 4,950,026 A | 8/1990 | Emmons |
| 4,951,967 A | 8/1990 | Michalik |
| 5,022,804 A | 6/1991 | Peterson |
| 5,077,601 A | 12/1991 | Hatada et al. |
| 5,105,640 A | 4/1992 | Moore et al. |
| 5,148,600 A | 9/1992 | Chen et al. |
| 5,148,900 A | 9/1992 | Mohan |
| 5,157,852 A | 10/1992 | Patrou et al. |
| 5,195,644 A | 3/1993 | Schmid |
| 5,205,476 A | 4/1993 | Sorenson |
| 5,211,047 A | 5/1993 | Kaneyuki |
| 5,211,330 A | 5/1993 | Frey |
| 5,225,799 A | 7/1993 | West et al. |
| 5,227,176 A | 7/1993 | McIntyre-Major |
| 5,234,246 A | 8/1993 | Henigue et al. |
| 5,234,727 A | 8/1993 | Hoberman |
| 5,239,741 A | 8/1993 | Shamos |

| | | |
|---|---|---|
| 5,255,969 A | 10/1993 | Cox et al. |
| 5,259,100 A | 11/1993 | Takahashi |
| 5,262,220 A | 11/1993 | Spriggs et al. |
| 5,284,043 A | 2/1994 | Hayashi |
| 5,292,027 A * | 3/1994 | Lueke .................. 220/495.06 |
| 5,297,836 A | 3/1994 | Parry-Williams |
| 5,302,435 A | 4/1994 | Hashimoto |
| 5,316,165 A | 5/1994 | Moran, Jr. |
| 5,333,519 A | 8/1994 | Holliday et al. |
| 5,362,120 A | 11/1994 | Cornille, Jr. |
| 5,372,026 A | 12/1994 | Roper |
| 5,377,519 A | 1/1995 | Hayashi |
| 5,378,172 A | 1/1995 | Roberts |
| 5,390,782 A | 2/1995 | Sinn |
| 5,392,629 A | 2/1995 | Goss et al. |
| 5,415,021 A | 5/1995 | Folmer |
| 5,427,732 A | 6/1995 | Shuert |
| 5,432,989 A | 7/1995 | Turek |
| 5,440,450 A | 8/1995 | Lau et al. |
| 5,452,799 A | 9/1995 | Sutherland |
| 5,460,773 A | 10/1995 | Fritz et al. |
| 5,466,146 A | 11/1995 | Fritz et al. |
| 5,475,911 A | 12/1995 | Wells et al. |
| 5,496,067 A | 3/1996 | Stolll et al. |
| 5,497,825 A | 3/1996 | Yu |
| 5,524,396 A | 6/1996 | Lalvani |
| 5,533,444 A | 7/1996 | Parks |
| 5,545,026 A | 8/1996 | Fritz et al. |
| 5,568,680 A | 10/1996 | Parker |
| 5,571,280 A | 11/1996 | Lehrer |
| 5,587,914 A | 12/1996 | Conradson et al. |
| 5,592,363 A | 1/1997 | Atarashi et al. |
| 5,615,795 A * | 4/1997 | Tipps .................... 229/185.1 |
| 5,619,784 A | 4/1997 | Nishimoto et al. |
| 5,620,623 A | 4/1997 | Baker |
| 5,630,469 A | 5/1997 | Butterbaugh et al. |
| 5,640,046 A | 6/1997 | Suzuki et al. |
| 5,660,365 A | 8/1997 | Glick |
| 5,679,388 A | 10/1997 | Fritz et al. |
| 5,692,672 A | 12/1997 | Hunt |
| 5,701,780 A | 12/1997 | Ver Meer |
| 5,704,212 A | 1/1998 | Erler et al. |
| 5,709,913 A | 1/1998 | Andersen et al. |
| 5,725,147 A | 3/1998 | Ljungstrom et al. |
| 5,737,226 A | 4/1998 | Olson et al. |
| 5,740,589 A | 4/1998 | Dominguez |
| 5,789,050 A | 8/1998 | Kang |
| 5,828,575 A | 10/1998 | Sakai |
| 5,855,275 A | 1/1999 | Hunter et al. |
| 5,882,064 A | 3/1999 | Emmons |
| 5,885,676 A | 3/1999 | Lobo et al. |
| 5,932,167 A | 8/1999 | Fritz et al. |
| 6,021,042 A | 2/2000 | Anderson et al. |
| 6,055,788 A | 5/2000 | Martin et al. |
| 6,065,323 A | 5/2000 | Arduino et al. |
| 6,071,574 A | 6/2000 | Weder |
| 6,132,349 A | 10/2000 | Yokoyama |
| 6,144,896 A | 11/2000 | Kask et al. |
| 6,158,652 A | 12/2000 | Ruiz et al. |
| 6,194,653 B1 | 2/2001 | McMiller et al. |
| 6,210,037 B1 | 4/2001 | Brandon, Jr. |
| 6,210,623 B1 | 4/2001 | Fritz et al. |
| 6,220,654 B1 | 4/2001 | Sommer |
| 6,233,538 B1 | 5/2001 | Gupta et al. |
| 6,279,288 B1 | 8/2001 | Keil |
| 6,296,300 B1 | 10/2001 | Sato |
| 6,296,301 B1 | 10/2001 | Schroeder et al. |
| 6,299,240 B1 | 10/2001 | Schroeder et al. |
| 6,330,153 B1 | 12/2001 | Ketonen et al. |
| 6,373,696 B1 | 4/2002 | Bolognia et al. |
| 6,386,009 B1 | 5/2002 | Ni et al. |
| 6,391,424 B1 | 5/2002 | Suzuki |
| 6,400,012 B1 | 6/2002 | Miller et al. |
| 6,412,325 B1 | 7/2002 | Croswell |
| 6,467,475 B2 | 10/2002 | Leutner et al. |
| 6,467,624 B1 * | 10/2002 | Lofgren et al. ................ 206/583 |
| 6,481,259 B1 | 11/2002 | Durney |
| 6,490,498 B1 | 12/2002 | Takagi |
| 6,558,775 B1 | 5/2003 | Suzuki |
| 6,588,244 B2 | 7/2003 | Chevalier |
| 6,592,174 B1 | 7/2003 | Rollin et al. |
| 6,599,601 B2 | 7/2003 | Fogle et al. |
| 6,626,560 B1 | 9/2003 | Caferro et al. |
| 6,631,630 B1 | 10/2003 | Pourboghrat et al. |
| 6,640,599 B1 | 11/2003 | Persson |
| 6,640,605 B2 * | 11/2003 | Gitlin et al. .................. 72/379.2 |
| 6,643,561 B1 | 11/2003 | Torvinen |
| 6,647,693 B2 * | 11/2003 | Bromberg ....................... 52/844 |
| 6,648,159 B2 | 11/2003 | Prutkin et al. |
| 6,658,316 B1 | 12/2003 | Mehta et al. |
| 6,677,562 B2 | 1/2004 | Oshima et al. |
| 6,688,043 B1 | 2/2004 | Feder et al. |
| 6,722,013 B1 | 4/2004 | Rapp |
| 6,728,114 B2 | 4/2004 | Serjack et al. |
| 6,745,608 B2 | 6/2004 | Miura |
| 6,761,502 B2 | 7/2004 | Bishop et al. |
| 6,805,566 B2 | 10/2004 | Chia-Chen |
| 6,821,606 B2 | 11/2004 | Suzuki |
| 6,831,255 B1 | 12/2004 | Levi et al. |
| 6,837,334 B1 | 1/2005 | Le Prevost |
| 6,844,050 B2 | 1/2005 | Noilhan |
| 6,868,708 B2 | 3/2005 | Carlsson et al. |
| 6,877,349 B2 | 4/2005 | Durney et al. |
| 6,917,017 B2 | 7/2005 | Moon et al. |
| 6,936,795 B1 | 8/2005 | Moon et al. |
| 6,940,716 B1 | 9/2005 | Korinsky et al. |
| 6,941,786 B1 | 9/2005 | Cooper et al. |
| 6,986,273 B2 | 1/2006 | Rager |
| 7,000,978 B1 | 2/2006 | Messano |
| 7,014,174 B2 | 3/2006 | Roberts et al. |
| 7,032,426 B2 * | 4/2006 | Durney et al. .................. 72/324 |
| 7,051,768 B2 | 5/2006 | Takahashi |
| 7,069,758 B2 | 7/2006 | Kariakin et al. |
| 7,099,154 B2 | 8/2006 | Ishiyama |
| 7,099,160 B1 | 8/2006 | Ice |
| 7,126,819 B2 | 10/2006 | Liang |
| 7,140,672 B2 | 11/2006 | Chernoff et al. |
| 7,152,449 B2 * | 12/2006 | Durney et al. .................. 72/324 |
| 7,152,450 B2 | 12/2006 | Durney et al. |
| 7,156,200 B2 | 1/2007 | Dershem et al. |
| 7,167,380 B2 | 1/2007 | Ice |
| 7,185,934 B2 | 3/2007 | Saeki |
| 7,222,511 B2 | 5/2007 | Durney et al. |
| 7,225,542 B2 | 6/2007 | Chernoff et al. |
| 7,243,519 B1 | 7/2007 | Chuang |
| 7,263,869 B2 | 9/2007 | Durney et al. |
| 7,264,304 B2 | 9/2007 | Carcioffi |
| 7,275,403 B2 | 10/2007 | Meyer |
| 7,281,754 B2 | 10/2007 | Behr |
| 7,296,455 B2 | 11/2007 | Durney |
| 7,331,505 B2 | 2/2008 | Holley, Jr. |
| 7,350,390 B2 | 4/2008 | Durney et al. |
| 7,354,639 B2 * | 4/2008 | Durney et al. ................. 428/136 |
| 7,374,810 B2 | 5/2008 | Durney et al. |
| 7,412,865 B2 | 8/2008 | Durney |
| 7,440,874 B2 | 10/2008 | Durney et al. |
| 7,464,574 B2 * | 12/2008 | Durney et al. .................. 72/324 |
| 7,503,623 B2 | 3/2009 | Favaretto |
| 7,534,501 B2 * | 5/2009 | Durney ........................ 428/596 |
| 7,560,155 B2 | 7/2009 | Durney et al. |
| 7,640,775 B2 | 1/2010 | Durney |
| 8,092,529 B2 * | 1/2012 | Malaviya et al. .......... 623/14.12 |
| 8,114,524 B2 * | 2/2012 | Durney ........................ 428/597 |
| 8,377,566 B2 * | 2/2013 | Durney et al. ................. 428/597 |
| 8,438,893 B2 * | 5/2013 | Durney et al. .................. 72/324 |
| 2001/0010167 A1 | 8/2001 | Leek |
| 2002/0153371 A1 | 10/2002 | Oshima et al. |
| 2002/0163173 A1 | 11/2002 | Ruehl et al. |
| 2002/0184936 A1 | 12/2002 | Gitlin et al. |
| 2002/0185892 A1 | 12/2002 | Rima et al. |
| 2003/0037586 A1 | 2/2003 | Durney et al. |
| 2003/0062739 A1 | 4/2003 | Bock |
| 2003/0104916 A1 | 6/2003 | Suzuki |
| 2004/0035175 A1 | 2/2004 | Karhumaki |
| 2004/0076800 A1 | 4/2004 | Noilhan |
| 2004/0079353 A1 | 4/2004 | Dimitrios |
| 2004/0103707 A1 | 6/2004 | Winters |
| 2004/0130182 A1 | 7/2004 | Bangle et al. |

| | | | | | | |
|---|---|---|---|---|---|---|
| 2004/0134250 | A1 | 7/2004 | Durney et al. | GB | 2 129 339 | | 5/1984 |
| 2004/0206152 | A1 | 10/2004 | Durney et al. | GB | 2 174 781 | A | 11/1986 |
| 2004/0207228 | A1 | 10/2004 | Gebreselassie et al. | GB | 2197457 | A | 5/1988 |
| 2005/0005670 | A1 | 1/2005 | Durney et al. | GB | 2427399 | A | 12/2006 |
| 2005/0042432 | A1 | 2/2005 | Jones et al. | JP | 52-068848 | | 6/1977 |
| 2005/0061049 | A1 | 3/2005 | Durney et al. | JP | 53-070069 | | 6/1978 |
| 2005/0064138 | A1 | 3/2005 | Durney et al. | JP | 55-022468 | | 2/1980 |
| 2005/0088014 | A1 | 4/2005 | Woodson et al. | JP | 55-055222 | | 4/1980 |
| 2005/0097937 | A1 | 5/2005 | Durney et al. | JP | 59-006116 | | 1/1984 |
| 2005/0117300 | A1 | 6/2005 | Prasher et al. | JP | 60061237 | A | 4/1985 |
| 2005/0120766 | A1 | 6/2005 | Friedman et al. | JP | 62094474 | A | 4/1987 |
| 2005/0126110 | A1 | 6/2005 | Durney et al. | JP | 63134381 | A | 6/1988 |
| 2005/0161979 | A1 | 7/2005 | Chernoff et al. | JP | 63263175 | A | 10/1988 |
| 2005/0167459 | A1 | 8/2005 | Storer | JP | 63263176 | A | 10/1988 |
| 2005/0168014 | A1 | 8/2005 | Chernoff et al. | JP | 1-136612 | | 5/1989 |
| 2005/0174732 | A1 | 8/2005 | Lin | JP | 02-065416 | | 5/1990 |
| 2005/0189790 | A1 | 9/2005 | Chernoff et al. | JP | 02-065416 | U | 5/1990 |
| 2005/0189791 | A1 | 9/2005 | Chernoff et al. | JP | 02-165817 | | 6/1990 |
| 2005/0257589 | A1 | 11/2005 | Durney et al. | JP | 02-192821 | | 7/1990 |
| 2005/0284088 | A1 | 12/2005 | Heath | JP | 02-258116 | | 10/1990 |
| 2006/0021413 | A1 | 2/2006 | Durney et al. | JP | 02-258116 | A | 10/1990 |
| 2006/0044755 | A1 | 3/2006 | Ishiyama | JP | 02-258117 | | 10/1990 |
| 2006/0053857 | A1 | 3/2006 | Durney | JP | 04-033723 | | 2/1992 |
| 2006/0059807 | A1 | 3/2006 | Zimmerman et al. | JP | 04-091822 | | 3/1992 |
| 2006/0061966 | A1 | 3/2006 | Korinsky et al. | JP | 04-91822 | | 3/1992 |
| 2006/0075798 | A1 | 4/2006 | Durney et al. | JP | 05-261442 | | 10/1993 |
| 2006/0096100 | A1 | 5/2006 | Stol et al. | JP | 05-261442 | A | 10/1993 |
| 2006/0130551 | A1 | 6/2006 | Durney et al. | JP | 05-278634 | A | 10/1993 |
| 2006/0175871 | A1 | 8/2006 | Eipper et al. | JP | 5-337580 | | 12/1993 |
| 2006/0181846 | A1 | 8/2006 | Farnsworth et al. | JP | 6063756 | | 3/1994 |
| 2006/0207212 | A1 | 9/2006 | Durney | JP | 07-148528 | | 6/1995 |
| 2006/0213245 | A1 | 9/2006 | Durney | JP | 7178463 | | 7/1995 |
| 2006/0232052 | A1 | 10/2006 | Breed | JP | 08-224619 | | 9/1996 |
| 2006/0232934 | A1 | 10/2006 | Kusamoto et al. | JP | 8-252879 | | 10/1996 |
| 2006/0237996 | A1 | 10/2006 | Eipper et al. | JP | 09-141333 | A | 6/1997 |
| 2006/0261139 | A1 | 11/2006 | Durney | JP | 10-085837 | | 4/1998 |
| 2006/0277965 | A1 | 12/2006 | Durney | JP | 11-123458 | | 5/1999 |
| 2007/0113614 | A1 | 5/2007 | Durney et al. | JP | 11-188426 | | 7/1999 |
| 2007/0117502 | A1 | 5/2007 | Kim | JP | 11-319952 | | 11/1999 |
| 2007/0123113 | A1 | 5/2007 | Durney | JP | 2000-198153 | | 7/2000 |
| 2007/0146988 | A1 | 6/2007 | Yamagishi et al. | JP | 2004-505780 | | 2/2004 |
| 2007/0206353 | A1 | 9/2007 | Boone et al. | MX | 05003149 | | 6/2005 |
| 2007/0231062 | A1 | 10/2007 | Durney | NL | 8900776 | A | 10/1990 |
| 2007/0241587 | A1 | 10/2007 | Fleming | TW | 159771 | | 6/1991 |
| 2007/0262128 | A1 | 11/2007 | Durney | TW | 167516 | | 9/1991 |
| 2007/0271793 | A1 | 11/2007 | Mellis et al. | TW | 422735 | | 2/2001 |
| 2007/0286722 | A1 | 12/2007 | Lan | TW | 431422 | | 4/2001 |
| 2008/0016937 | A1 | 1/2008 | Durney et al. | TW | 451893 | | 8/2001 |
| 2008/0048366 | A1 | 2/2008 | Durney | TW | 451896 | | 8/2001 |
| 2008/0054683 | A1 | 3/2008 | Takeda | TW | 544356 | | 8/2003 |
| 2008/0063834 | A1 | 3/2008 | Durney et al. | WO | WO 94/06710 | | 3/1994 |
| 2008/0098787 | A1 | 5/2008 | Durney | WO | WO 97/24221 | | 7/1997 |
| 2008/0121009 | A1 | 5/2008 | Durney et al. | WO | WO 97/24221 | A1 | 7/1997 |
| 2008/0187427 | A1 | 8/2008 | Durney | WO | WO 98/38073 | | 9/1998 |
| 2008/0193714 | A1 | 8/2008 | Durney et al. | WO | WO 02/13991 | | 2/2002 |
| 2008/0250837 | A1 | 10/2008 | Durney | WO | WO 02/051688 | | 7/2002 |
| 2008/0271511 | A1 | 11/2008 | Durney et al. | WO | WO 2004/028937 | | 4/2004 |
| 2008/0276682 | A1 | 11/2008 | Durney | WO | WO 2004/098810 | | 11/2004 |
| 2009/0297740 | A1 | 12/2009 | Durney | WO | WO 2005/082112 | | 9/2005 |
| 2010/0201158 | A1 | 8/2010 | Miyashita | WO | WO 2005/099925 | | 10/2005 |
| 2011/0287228 | A1 | 11/2011 | Durney et al. | WO | WO2006/017290 | A2 | 2/2006 |
| | | | | WO | WO2006/017290 | A3 | 2/2006 |
| FOREIGN PATENT DOCUMENTS | | | | WO | WO2006/031553 | A2 | 3/2006 |
| | | | | WO | WO2006/031553 | A3 | 3/2006 |
| CA | 1233304 | | 3/1988 | WO | WO 2006/036462 | | 4/2006 |
| CA | 2419225 | | 6/2009 | WO | WO2006/053197 | A2 | 5/2006 |
| CN | 1206371 | A | 1/1999 | WO | WO2006/053197 | A3 | 5/2006 |
| CN | 1292106 | | 4/2001 | WO | WO2006/055776 | A2 | 5/2006 |
| DE | 3642208 | A1 | 6/1987 | WO | WO2006/055776 | A3 | 5/2006 |
| DE | 3906958 | A1 | 9/1990 | WO | WO2006/057844 | A2 | 6/2006 |
| DE | 298 18 909 | U1 | 2/1999 | WO | WO2006/065568 | A2 | 6/2006 |
| DE | 29818909 | U1 | 2/1999 | WO | WO2006/065568 | A3 | 6/2006 |
| DE | 19746931 | C1 | 6/1999 | WO | WO2006/957844 | A3 | 6/2006 |
| DE | 19951850 | C1 | 1/2001 | WO | WO2006/089090 | A2 | 8/2006 |
| EP | 0873858 | | 10/1998 | WO | WO2006/089090 | A3 | 8/2006 |
| EP | 1529575 | A2 | 5/2005 | WO | WO2006/099420 | A2 | 9/2006 |
| GB | 590720 | | 7/1947 | WO | WO2006/099420 | A3 | 9/2006 |
| GB | 740933 | | 11/1955 | WO | WO2006/102089 | A2 | 9/2006 |
| GB | 955666 | | 4/1964 | WO | WO2006/102089 | A3 | 9/2006 |
| GB | 2054690 | | 6/1979 | | | | |

| | | | |
|---|---|---|---|
| WO | WO2006/104789 A2 | 10/2006 | |
| WO | WO2006/104789 A3 | 10/2006 | |
| WO | WO 2007/038154 | 4/2007 | |
| WO | WO2007/078822 A1 | 7/2007 | |
| WO | WO 2007/134114 A2 | 11/2007 | |
| WO | WO 2007/134114 A3 | 11/2007 | |
| WO | WO2008/027921 A2 | 3/2008 | |
| WO | WO2008/027921 A3 | 3/2008 | |
| WO | WO2008/030821 A2 | 3/2008 | |
| WO | WO2008/030821 A3 | 3/2008 | |
| WO | WO2008/052174 A2 | 5/2008 | |
| WO | WO2008/052174 A3 | 5/2008 | |
| WO | WO2008/098217 A2 | 8/2008 | |
| WO | WO2008/098217 A3 | 8/2008 | |
| WO | WO2008/128217 A1 | 10/2008 | |
| WO | WO2008/128226 A1 | 10/2008 | |
| WO | WO2009/039526 A2 | 3/2009 | |
| WO | WO2009/039526 A3 | 3/2009 | |
| WO | WO2009/039528 A1 | 3/2009 | |
| WO | WO2009/039529 A1 | 3/2009 | |
| WO | WO2009/086317 A1 | 7/2009 | |
| WO | WO2009/086329 A1 | 7/2009 | |
| WO | WO2009/103071 A2 | 8/2009 | |
| WO | WO2009/103071 A3 | 8/2009 | |
| WO | WO2010/093710 A1 | 8/2010 | |

OTHER PUBLICATIONS

Derwent Abstract Accession No. 1995-280162/37, M21, JP 3474242, Dec. 8, 2003 (Amada Co Ltd).
Derwent Abstract Accession No. 80-C6243C/12, FR 2428372 A, Feb. 8, 1980 (Merlin & Gerin).
Derwent Abstract Accession No. 83-G2401K/19, FR 2514103 A, Apr. 8, 1983 (Grun).
Derwent Abstract Accession No. 97-345802/32, P52, JP 9 141333 A, Jun. 3, 1997 (Kokusai Denki KK).
EasyBend™—Complex Bending Made Easy, © 2004 Mate Precision Tooling Inc., Anoka, Minnesota.
Publication "Office dA" by Contemporary World Architects, 2000, pp. 15, 20-35, Rockport Publishers, Inc., Gloucester, Massachusetts.
PCT/US2008/053494 (WO2008098217) International Preliminary Report on Patentability (1 page) dated Aug. 11, 2009; Written Opinion of the International Searching Authority (5 pages) dated Jul. 18, 2008; pp. 1-6. (for the PCT application corresponding to the present application 12/028,713).
PCT/US2008/053494 (WO2008098217) International Search Report dated Jul. 18, 2008, 1 page. (for the PCT application corresponding to the present application 12/028,713).
"Hold the Press", Eureka Magazine, Aug. 2007, vol. 27, No. 8, Findlay Publications Ltd., Darford Kent UK, pp. 12-13.
Derwent Abstract Accession No. 1999-340844/29, P52, JP 11 123458 A (Meiji Nat Kogyo KK) May 11, 1999. cited by other.
Derwent Abstract Accession No. 98-265616/24, P52, JP 10 085837 A (Mitsubishi Electric Corp) Apr. 7, 1998. cited by other.
Patent Abstracts of Japan, vol. 004, No. 053 (M-008), Apr. 19, 1980 (JP 55-022468 A).
Patent Abstracts of Japan, vol. 015, No. 006 (M-1066), Jan. 8, 1991 (JP 02-258116 A). cited by other.
Singh, H., "Sheet Metal Hydroforming", Fundamentals of Hydroforming, Society of Manufacturing Engineers, Dearborn, Michigan (2003), pp. 29-35.
Snap to it, International Sheet Metal Review, Sep./Oct. 2005, pp. 40-42.
SnapLock™—Fabricated Joints Without Welding, © 2002 Mate Precision Tooling Inc., Anoka, Minnesota.
U.S. Appl. No. 09/640,267, filed Aug. 17, 2000, Durney.
U.S. Appl. No. 10/256,870, filed Sep. 26, 2002, Durney.
U.S. Appl. No. 10/672,766, filed Sep. 26, 2003, Durney, et al.
U.S. Appl. No. 10/795,077, filed Mar. 3, 2004, Durney, et al.
U.S. Appl. No. 10/821,818, filed Apr. 8, 2004, Durney, et al.
U.S. Appl. No. 10/827,818, filed Apr. 8, 2004, Fiean Liem.
U.S. Appl. No. 10/861,726, filed Jun. 4, 2004, Durney, et al.
U.S. Appl. No. 10/931,615, filed Aug. 31, 2004, Durney, et al.
U.S. Appl. No. 10/938,170, filed Sep. 10, 2004, Durney.
U.S. Appl. No. 10/952,357, filed Sep. 27, 2004, Durney.
U.S. Appl. No. 10/985,373, filed Nov. 9, 2004, Durney, et al.
U.S. Appl. No. 11/016,408, filed Dec. 16, 2004, Durney, et al.
U.S. Appl. No. 11/080,288, filed Mar. 14, 2005, Durney, et al.
U.S. Appl. No. 11/180,398, filed Jul. 12, 2005, Durney, et al.
U.S. Appl. No. 11/290,968, filed Nov. 29, 2005, Durney, et al.
U.S. Appl. No. 11/357,934, filed Feb. 16, 2006, Durney.
U.S. Appl. No. 11/374,828, filed Mar. 13, 2006, Durney.
U.S. Appl. No. 11/384,216, filed Mar. 16, 2006, Durney.
U.S. Appl. No. 11/386,463, filed Mar. 21, 2006, Durney.
U.S. Appl. No. 11/411,440, filed Apr. 25, 2006, Durney, et al.
U.S. Appl. No. 11/533,355, filed Sep. 19, 2006, Durney.
U.S. Appl. No. 11/611,100, filed Dec. 14, 2006, Durney.
U.S. Appl. No. 11/746,375, filed May 9, 2007, Durney.
U.S. Appl. No. 11/754,344, filed May 28, 2007, Durney, et al.
U.S. Appl. No. 11/842,932, filed Aug. 21, 2007, Holman, et al.
U.S. Appl. No. 11/849,481, filed Sep. 4, 2007, Durney.
U.S. Appl. No. 11/925,195, filed Oct. 26, 2007, Durney, et al.
U.S. Appl. No. 11/927,341, filed Oct. 29, 2007, Durney, et al.
U.S. Appl. No. 11/927,608, filed Oct. 29, 2007, Durney.
U.S. Appl. No. 11/927,626, filed Oct. 29, 2007, Durney, et al.
U.S. Appl. No. 11/927,666, filed Oct. 29, 2007, Durney, et al.
U.S. Appl. No. 11/928,074, filed Oct. 30, 2007, Durney.
U.S. Appl. No. 11/928,433, filed Oct. 30, 2007, Durney, et al.
U.S. Appl. No. 11/928,504, filed Oct. 30, 2007, Durney, et al.
U.S. Appl. No. 11/928,596, filed Oct. 30, 2007, Durney.
U.S. Appl. No. 11/929,094, filed Oct. 30, 2007, Durney.
U.S. Appl. No. 11/929,201, filed Oct. 30, 2007, Durney.
U.S. Appl. No. 11/929,747, filed Oct. 30, 2007, Durney.
U.S. Appl. No. 11/929,780, filed Oct. 30, 2007, Durney, et al.
U.S. Appl. No. 11/930,035, filed Oct. 30, 2007, Durney, et al.
U.S. Appl. No. 11/930,058, filed Oct. 30, 2007, Durney, et al.
U.S. Appl. No. 12/028,713, filed Feb. 8, 2008, Durney.
U.S. Appl. No. 12/103,547, filed Apr. 15, 2008, Durney.
U.S. Appl. No. 12/235,551, filed Sep. 22, 2008, Durney, et al.
U.S. Appl. No. 12/235,571, filed Sep. 22, 2008, Durney, et al.
U.S. Appl. No. 12/235,586, filed Sep. 22, 2008, Durney, et al.
U.S. Appl. No. 12/250,515, filed Oct. 13, 2008, Durney, et al.
U.S. Appl. No. 12/341,951, filed Dec. 22, 2008, Durney, et al.
U.S. Appl. No. 12/372,493, filed Feb. 17, 2009, Durney, et al.
U.S. Appl. No. 12/468,654, filed May 19, 2009, Durney.
U.S. Appl. No. 12/703,654, filed Feb. 10, 2010, Durney.
U.S. Appl. No. 60/799,215, filed May 9, 2006, Durney.
U.S. Appl. No. 60/799,217, filed May 9, 2006, Durney.
CN200880011194.8 Office Action mailed Dec. 31, 2011 (Chinese and English translation).

* cited by examiner

*Primary Examiner* — Jeanette E. Chapman
(74) *Attorney, Agent, or Firm* — K&L Gates LLP

(57) ABSTRACT

A load-bearing three-dimensional structure including a skeletal structure formed by a sheet of material having a plurality of bend lines, each bend line including a plurality of folding displacements, wherein the sheet of material is bent along the bend lines into a box-section; and a reinforcing member configured for substantially surrounding a portion of the skeletal structure when bent into a box-section to reinforce the structural integrity of the skeletal structure. A method of manufacturing the three-dimensional structure is also disclosed.

9 Claims, 12 Drawing Sheets

LOAD-BEARING THREE-DIMENSIONAL STRUCTURE

CROSS-REFERENCES TO RELATED APPLICATIONS

This application claims priority to U.S. Provisional Patent Application No. 60/889,262 filed Feb. 9, 2007.

This application is also related to U.S. patent application Ser. No. 11/411,440 filed Apr. 25, 2006, U.S. patent application Ser. No. 10/861,726 filed Jun. 4, 2004 (now U.S. Pat. No. 7,032,426), U.S. patent application Ser. No. 10/672,766 filed Sep. 26, 2003 (now U.S. Pat. No. 7,152,449), U.S. patent application Ser. No. 10/256,870 filed Sep. 26, 2002 (now U.S. Pat. No. 6,877,349), and U.S. patent application Ser. No. 09/640,267 filed Aug. 17, 2000 (now U.S. Pat. No. 6,481,259).

This application is also related to U.S. patent application Ser. No. 11/180,398 filed Jul. 12, 2005 and to U.S. Provisional Patent Application No. 60/587,470 filed Jul. 12, 2004.

This application is also related to U.S. patent application Ser. No. 11/384,216 filed Mar. 16, 2006 and to U.S. Provisional Patent Application No. 60/663,392 filed Mar. 17, 2005.

This application is also related to U.S. patent application Ser. No. 10/952,357 filed Sep. 27, 2004.

This application is also related to U.S. patent application Ser. No. 11/842,932 filed Aug. 21, 2007, U.S. patent application Ser. No. 10/931,615 filed Aug. 31, 2004 (now U.S. Pat. No. 7,263,869), and U.S. patent application Ser. No. 10/795,077 filed Mar. 3, 2004 (now U.S. Pat. No. 7,152,450).

The entire content of the above-mentioned applications for patents are incorporated herein by this reference.

TECHNICAL FIELD

This invention relates, in general, to the designing and precision folding of sheets of material and the manufacture of three-dimensional load-bearing structures therefrom. More particularly, the present invention relates to ways of designing, manufacturing, and preparing two-dimensional sheets material in order to enable precision folding into a three-dimensional structure having high-strength and fatigue-resistance for use with industrial machinery and other load-bearing structures.

BACKGROUND OF THE INVENTION

Industrial machinery such as backhoes, loaders, harvesters, and material handlers utilize linkage arms to connect the main body of the machinery to the material handling components. Linkage arms manipulate loaders, shovels, and other components in myriad applications such as hauling, digging, grading, and lifting. The arms allow materials to be moved relative to the body of the respective machinery. Other machinery utilize arms to support plows or blades for groundwork.

Machinery such as backhoe loaders and forest machines use multiple arms as a linkage to perform digging work. One end of the linkage is connected to an engine or motor. The other end is connected to a digging shovel. Each individual arm has a pivot for mounting to another linkage arm and mounting points for controls rods or struts. The struts control each arm in the linkage such that the shovel can be positioned and forced into the ground. As such, the linkage arms must have extremely high strength and fatigue resistance at the pivot points and throughout the structure.

Although the linkage arm may be manufactured as a solid beam, a solid beam is cumbersome, heavy, and does not make economical use of materials. The traditional approach to the manufacture of cost-effective linkage arms has been to weld multiple planar pieces of steel together to form a three-dimensional structure. The planar pieces may be welded together along their edges or faces to form load-bearing structures with minimal use of material. In applications calling for a more pleasing cosmetic appearance, the arm may be configured as a box-beam that appears as a solid object but has a hollow center. Other arms are essentially load beams with cross-sections shaped like an "I" or other such shapes.

As compared to solid arms, these arms support high load forces with a fraction of the material use and weight. Such arms, however, have several drawbacks. In particular, these linkage arms and support beams require significant welding along all the edges of the component parts which presents problems during the manufacturing and assembly processes.

The use of complex welding in the assembly process adds significant logistical problems and cost-concerns to the manufacturing process. For example, the manufacturing process for welded beams requires a long weld line to be formed along the edges of the sheets of stock material. The weld lines are the key to the structural integrity of the linkage arm and thus require a skilled welder and time.

Modern robotics can limit welding errors and decrease manufacturing time; however, such robots require significant investment and add manufacturing complexity. Welding robots are costly and cumbersome. Significant space must be allotted to the welding area and safety region around the robots. Given the size of the equipment needed for high-temperature welding, once the body shop is configured, it can not be easily moved. Furthermore, every time an engineering change is made, additional time and money investment will be required to reconfigure the manufacturing process.

Having the welding done away from the assembly line also adds to manufacturing time. Once the welds are finished, the piece must be cooled and possibly treated before being handled or moved to the assembly line.

In addition to manufacturing issues, welded beams present shipping, assembly, and repair concerns. Because the arms require skilled labor and heavy machinery to manufacture, they must be manufactured near the machine assembly line or shipped as an assembled unit. In comparison to shipping and handling of sheet stock, shipping an entire linkage arm greatly increases costs and logistical problems.

Additionally, in the field, repair of linkage arms and beams can be more inefficient than the original manufacturing process. Shipping an entire linkage arm can be costly. For this reason, when many simple structures are needed, parts are typically shipped to the site and welding is done on-site. However, this requires a highly-skilled welder to be at the site. A problem also arises from the handling and accurate positioning of the several parts in place when welding or bonding them together. The entire process can take significant time and extends downtime when a linkage arm fails.

Recently, another approach previously applied exclusively to small three-dimensional structures has gained interest as an alternative to welded structures. Such designs involve the manufacture of three-dimensional structures with conventional tools from a two-dimensional sheet. The sheet material is bent along a first line and then bent again along subsequent bend lines with reference to the previous bend lines.

The folded sheets of the Related Applications often have been used to provide three-dimensional structures including, but not limited to, electrical appliances, electronic component chassis for computers, audio receivers, televisions, motor vehicles, autos, aerospace, appliances, industrial, and other goods.

Folding technology offers many advantages over welding. In particular, it allows for easier and quicker assembly without the use of skilled labor. It also allows the part to be shipped and moved as a sheet material and later assembled quickly on-location.

Advances in folding technology have allowed the use of thicker sheet material, which greatly increases the strength of the resulting three-dimensional structure. Thus, a stable three-dimensional structure can be formed without the need for extensive welding and cumbersome tools.

One common approach to folding sheets has been to employ sheets of materials with regions designed to control the location of the bends in the sheet material by slitting or grooving the material along a bend line. U.S. Pat. No. 6,640,605 to Gitlin et al. and U.S. Pat. No. 4,628,661 to St. Louis describe exemplars of such designs.

Using a tool such as a cutting edge, thinned regions or slits may be introduced to a sheet of material to promote bending of the material about a bend line. Alternating series of slits are cut parallel to and laterally offset from a desired bend line to promote bending of the material. The material between the overlapping slits forms bending webs or straps therebetween. As the material is bent, the straps twist and plastically deform to allow the sheet to be folded along the slit portion. Since the slits can be laid out on a flat sheet of material precisely, the cumulative error from multiple bending decreases.

In addition to other limitations discussed in detail in the applications mentioned above, the slit- and groove-based bending of sheet material described by Gitlin et al. and St. Louis have several problems under loading. The stresses in the bending straps of these designs are substantial and concentrated. If the material is grooved such that the slit does not fully penetrate the material as taught by St. Louis, then the stresses on the backside or bottom web of the groove are also substantial and concentrated. As the material is bent and the straps twist, micro tears form in the strap region. Thus, the resulting material is overstressed and failures can occur along the bending region.

Additionally, groove and slit designs similar to the designs taught by Gitlin et al. and St. Louis can not withstand significant load forces. In fact, St. Louis and Gitlin et al. admittedly apply only to minimally loaded three-dimensional structures such as appliance frames, housings, or covers. In fact, Gitlin et al. and other conventional methods are directed to bending plastic or paperboard. Even if thicker material were combined with the designs of Gitlin et al. and St. Louis, the resulting three-dimensional structure could not support significant loads.

These designs are limited in application for several reasons. First, as a result of the stresses on the straps as they are twisted during bending, they are prone to failure if any significant force is applied to the structure. Second, these configurations also lack support for the faces. Loads on the structure are held primarily by the bent straps because the edges of the slits are forced away from an opposing face during bending.

In order to strengthen the strap region, the straps can be increased in length by increasing the overlap of alternating slits. As the strap length increases, however, the force of the straps pulling the sheet against an opposing face decreases. Thus, such conventional slit designs require a trade-off between reduction of stresses in the strap regions and maintaining edge-to-face contact to support the structure.

Another approach to slitting sheet material that provides greater structural integrity is described in U.S. patent Ser. No. 10/931,615, to Durney et al., hereby incorporated by reference. This design provides for a groove defining a bending strap at one end that extends obliquely across the bend line. The straps are defined so as to promote edge-to-face contact during bending. In contrast to slit designs such as Gitlin et al., the strap extends obliquely across the bend line and bends rather than twists or torques during bending. The contact of the edges with an adjacent face also provides support to the three-dimensional structure's sides far greater than the slit and groove designs taught by Gitlin et al. and St. Louis. The diverging end portions and location of the bend straps further reduces stress concentrations over such slit and groove designs.

Folded sheets generally have free or adjacent planar segments that are folded into abutting or overlapping relation and then affixed and/or joined together to stabilize the resulting structure against unfolding and to otherwise promote rigidity. The previous techniques for affixing and/or joining the planar segments of the folded sheets together have varied considerably, depending upon the application. In many instances, adjoining planar segments on either side of a bend line have been three-dimensionally fixed utilizing a third, intersecting planar segment or other intersecting structure to limit the degrees of freedom and otherwise promote rigidity between the adjoining planar segments.

Nonetheless, even this design in combination with a thick sheet material does not have sufficient strength to support high loads for use as a linkage arm or load beam. A linkage arm for industrial machinery such as hoes, loaders, and handlers generally must withstand tens of thousands of foot-pounds torque while moving in three-dimensions with minimal fatigue during the life of its use. For example, a typical digging application call for swing load capacity of over 50,000 ft-lb. swing torque at 10 rpm and load capacity of 6000 lbs.

Prior art sheet material designed to be bent into a three-dimensional structure have several limitations preventing their use in such high-load applications. First, folding displacements in general lack the rigidity of a weld. The structure is thus prone to wobble or collapse when high forces are applied.

Folding technology also does not easily allow the formation of shapes such as an "I-beam," which has a superior ratio of strength to material use than prior folding technology shapes. Furthermore, prior art sheet designs can not accommodate load-bearing junctions, such as pivot mounts, for attachment to other structures. With respect to typical linkage arms for industrial machinery, the structure must have a portion at one end with a bore for fastening to a contiguous structure such as another linkage arm or shovel. Prior art designs do not have the strength at each end to support a shaft or fastener imposing a high lateral and torsional forces.

What is needed is a sheet material which overcomes the above and other disadvantages of known folding displacements in high-load applications. In particular, what is needed is a three-dimensional structure with the advantages of a sheet material with folding displacements but the structural integrity of a welded or solid beam.

BRIEF SUMMARY OF THE INVENTION

In summary, one aspect of the present invention is directed to a load-bearing three-dimensional structure including a skeletal structure formed by a sheet of material having a plurality of bend lines, each bend line including a plurality of folding displacements, wherein the sheet of material is bent along the bend lines into a box-section; and a reinforcing member configured for substantially surrounding a portion of the skeletal structure when bent into a box-section to reinforce the structural integrity of the skeletal structure.

Each folding displacement may have a central portion substantially parallel to and offset laterally from a desired bend line and at least one end portion extending away from the bend line. Distal ends of two opposing walls of the skeletal structure may extend beyond the box-section and include concentric bores configured to receive a shaft therethrough.

The reinforcing member is formed by a sheet of material including a plurality of bend lines, each bend line including a plurality of folding displacements. Further, the number of bend lines may correspond to the number of corners of the skeletal structure. The folding displacement may have a central portion substantially parallel to and offset laterally from a desired bend line.

The skeletal structure may be configured to form a flush surface when folded. The reinforcing member further including face portions configured for mutual engagement when the reinforcing member is folded. The reinforcing member may be further configured to form a flush surface when folded.

The three-dimensional structure further including a pair of support plates, the support plates configured for mounting to opposite peripheral faces of one of the reinforcing member and skeletal structure at the distal end. Each support plate may have non-linear inner edge configured for dispersion of stress forces.

A reinforcing plate configured for interconnecting two or more three-dimensional structures may also be provided. Outer edges of the reinforcing plate are shaped for concentrating stress forces away from an interconnecting region of the three-dimensional structures. The bend lines of the three-dimensional structure form four faces and a flange section.

The three-dimensional structure may further include shin members, wherein each shin member is configured for impact resistance and disposed along a corner edge of one of the reinforcing member and skeletal structure. The three-dimensional structure may further include a gusset having peripheral tongue members, the gusset being configured to be wrapped along a peripheral edge by the skeletal structure, wherein the skeletal structure includes grooves for receiving the tongue members.

In one aspect of the present invention the three-dimensional structure is a linkage arm, wherein the linkage arm is part of a digging arm assembly. In another aspect, the three-dimensional structure is a leg, wherein the leg is linkage arm in a digging arm assembly.

In one aspect of the present invention, the skeletal structure and reinforcing member are composed of the same material.

In another aspect of the present invention, a load-bearing three-dimensional structure comprises a skeletal structure formed by a sheet of material having a plurality of slit portions defining bend lines, each slit portion including a plurality of slits, each slit having a central portion substantially parallel to and offset laterally from a desired bend line and with at least one end portion extending away from the bend line, the sheet of material being bent along the bend lines into a box-section, wherein the skeletal structure has at least one flange section, the flange section has a non-linear edge configured for dispersion of stresses along multiple axes or directions in a plane formed by engagement of the flange section with the skeletal structure. The flange section may be affixed by a weld. The skeletal structure has two flange sections, each flange section has a non-linear edge and complementary shape to the edge of the other flange section. One flange section may overlap the other flange section. The first flange section may be affixed to the other along a non-linear edge. The non-linear edge may have a wave-shape.

Yet another aspect of the present invention is directed to a method for fabricating a load-bearing three-dimensional structure, the method comprising the steps of providing a skeletal structure formed by a sheet of material having a plurality of bend lines, each bend line including a plurality of folding displacements; folding the skeletal structure into a three-dimensional structure along the bend lines; fastening a free end of the skeletal structure; providing a reinforcing member having bend lines corresponding to the skeletal structure; folding the reinforcing member around the skeletal structure; and fastening a free end of the reinforcing member.

The three-dimensional structure of the present invention has other features and advantages which will be apparent from or are set forth in more detail in the accompanying drawings, which are incorporated in and form a part of this specification, and the following Detailed Description of the Invention, which together serve to explain the principles of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
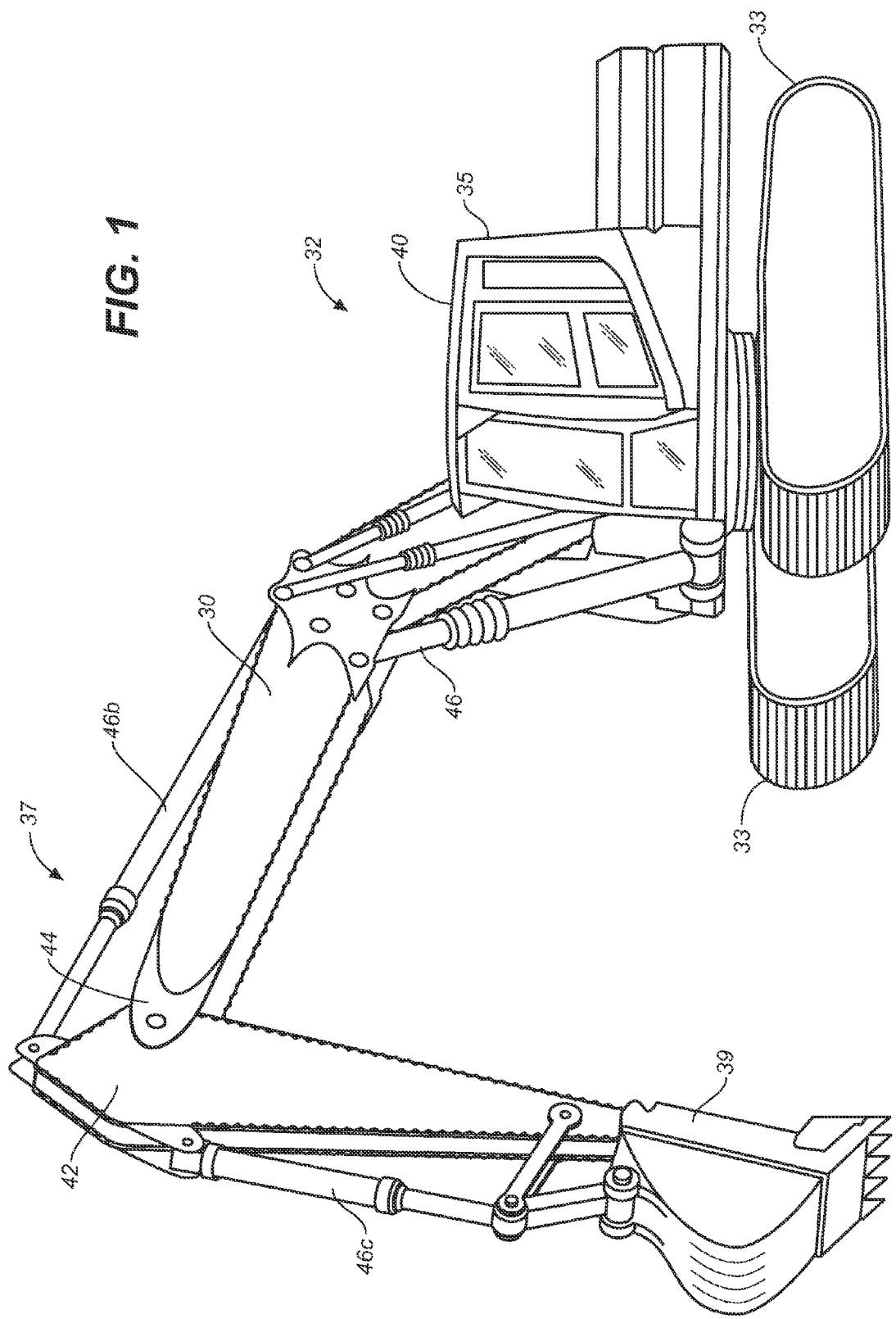
FIG. 1 is a perspective view of a folded three-dimensional structure in accordance with the present invention, the structure illustrated as linkage arm on a front hoe.

Turning now to the drawings, wherein like components are designated by like reference numerals throughout the various figures, attention is directed to FIG. 1 which illustrates a three-dimensional linkage arm formed from a substantially two-dimensional single sheet of material in accordance with the present invention, which structure is generally designated by the numeral 30. While the illustrated embodiment is a high load-bearing linkage arm for a digging arm assembly, one will appreciate that a number of three-dimensional structures including, but not limited to, load-bearing beams, housings, covers, electronics components, artistic sculptures, chassis, stands, electrical appliances, enclosures, furniture, and electromagnetic shields may be formed in accordance with the present invention. In general, parts and assemblies for use in the automotive, construction, aerospace, packaging, industrial, metal and other fields may also be formed in accordance with the present invention.

In one embodiment, a front hoe or digging shovel, generally designated 32, includes tracks 33, machine body 35, digging arm assembly 37, and shovel 39. The cab body includes a cab 40 and the primary engine and control components.

The digging arm assembly has two linkage arms 30 and 42 connected at pivot mount 44 by a mechanical fastener or other known methods. A first linkage arm 30 is formed by two beam structures joined at an angle and connected to body 35 at one end. A pair of control rods 46 fixed to the top portion of reinforcing plates 47 control the rotation of linkage arm 30. A second pair of control rods 46*b* fixed to the first linkage arm at one end and an end of the second linkage arm 42 at another end control the rotation of the arm. A third pair of control rods 46*c* control the rotation of shovel 39 that digs into the earth.

Referring now to FIGS. 2-5, linkage arm 30 generally includes two three-dimensional structures 49, reinforcing plates 47, and pivot mounts 44 at each end. Three-dimensional structures 49 are positioned back-end to back-end and reinforced with the reinforcing plates 47 (best seen in FIG. 3). The three-dimensional structures are bonded by welding, fasteners, brazing, adhesives, or other means known in the art.

Structures 49 may include additional support members such as cross-braces, corners braces, support or spot welds, integral support structures, gussets and the like. Further, FIGS. 10 and 11 illustrate gussets and shin members used in conjunction with the three-dimensional structure in accordance with the present invention. Likewise, the dimensions and configuration of the reinforcing plates may be varied to modify the structural and dimensional characteristics of the assembled three-dimensional linkage arm as desired for a particular application.

The reinforcing plate is fixed to the structures 49 in the same manner and provides additional support to the junction between the two structures. Reinforcing plate 47 has a non-linear edge configured for dispersion of stress forces. In the illustration, the reinforcing plate has rounded serifs or pointed regions for concentrating stress forces away from the central junction area. One will appreciate that the reinforcing plate can have a variety of shapes to advantageously disperse stress forces away from the junction region. Additionally, one will appreciate that structures 49 and reinforcing plate 47 can be joined by methods other than welding including, but not limited to, adhesives, fasteners, and interlocking members. In one embodiment, the thicknesses of the sheets of material forming the structure reinforcing plate are substantially equal. However, one will appreciate that the thickness of the reinforcing plate may be less than or greater than that of the structure. Preferably, the thickness of the sheets of material is between $\frac{1}{8}"$ and $\frac{1}{2}"$.

One will appreciate that the configuration and assembly of the three-dimensional structure may vary depending on application requirements. Other configurations include, but are not limited to, various-shaped supporting structures and plates, interior supports members, and modification of the skeletal structure shape.

Figure 4:
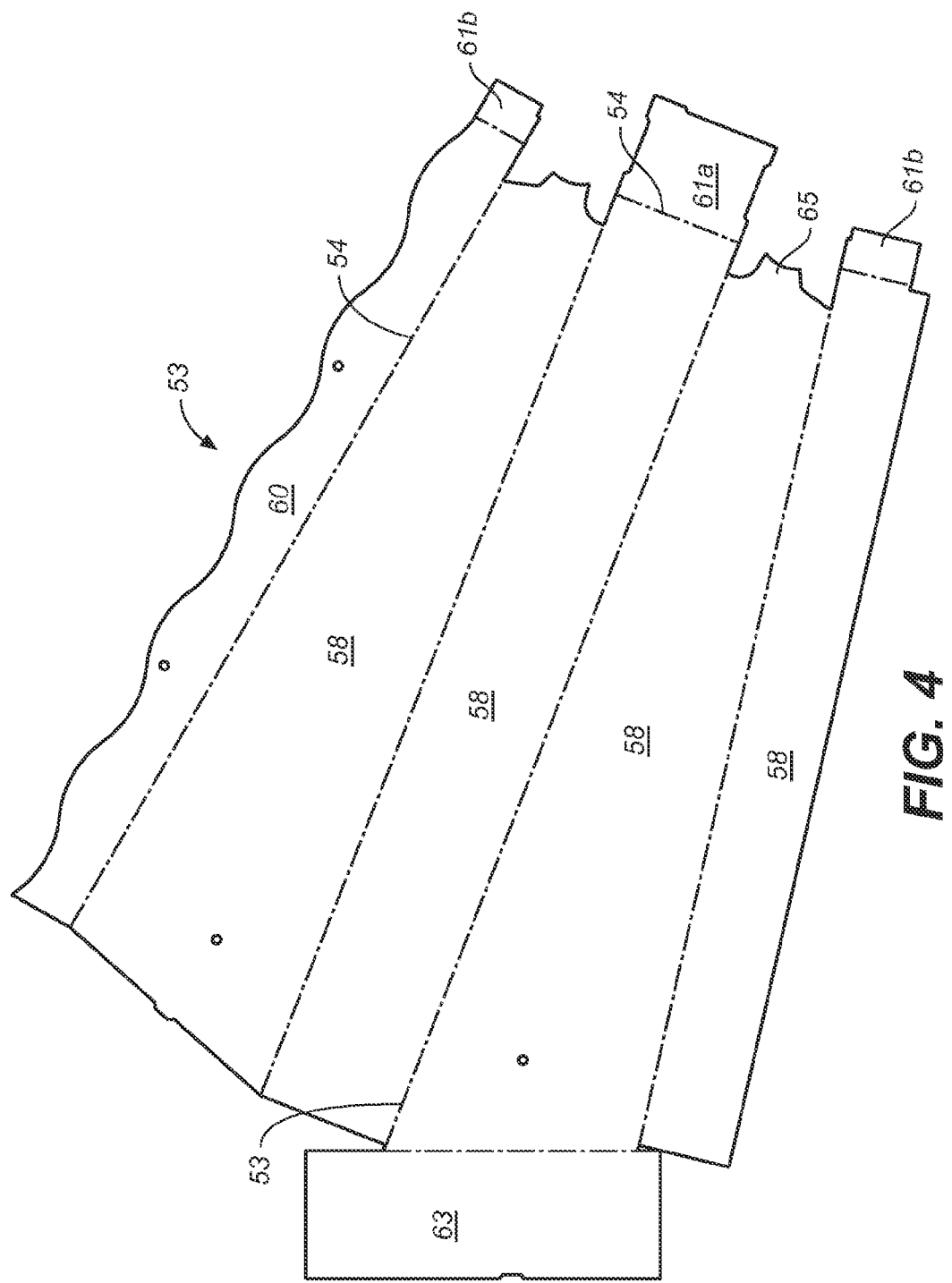
FIG. 4 is a top view of the linkage arm of FIG. 1, the structure shown as a two-dimensional, unfolded sheet.

Three-dimensional structures 49 are formed from a two-dimensional monolithic sheet of material 51 shown in FIG. 4. In one embodiment, the sheet of material has nine planar segments, wherein each adjoining planar segment is separated by a respective bend line 53 populated by one or more folding displacements 54. The planar segments include four faces 56, a flange section 58, three front faces 60, and a back face 61. One will appreciate that three, four, five or more planar segments may be provided depending upon the desired overall geometry of the resulting three-dimensional structure.

In forming the three-dimensional structure, the sheet of material is bent along the bend lines. In one embodiment, flange section 63 folds over a face section. In one embodiment, the flange section engages with an opposing flange section to form a flush face thereby forming a mid-plane closure 100 (best seen in FIG. 2).

The folding displacements, bend-controlling structures, and other principles which control precise sheet material folding are set forth in more detail in Applicant's prior U.S. patent application Ser. Nos. 11/411,440 filed Apr. 25, 2006, 11/384,216 filed Mar. 16, 2006, 11/374,828 filed Mar. 13, 2006, 11/357,934 filed Feb. 16, 2006, 11/290,968 filed Nov. 29, 2006, 11/180,398 filed Jul. 12, 2005, 11/080,288 filed Mar. 14, 2005, 10/985,373 filed Nov. 9, 2004, 10/952,357 filed Sep. 27, 2004, 10/931,615 filed Aug. 31, 2004, 10/861,726 filed Jun. 4, 2004 (now U.S. Pat. No. 7,032,426), 10/821,818 filed Apr. 8, 2004, 10/795,077 filed Mar. 3, 2004, 10/672,766 filed Sep. 26, 2003, 10/256,870 filed Sep. 26, 2002 (now U.S. Pat. No. 6,877,349); and 09/640,267 filed Aug. 17, 2000 (now U.S. Pat. No. 6,481,259), the entire content of which applications and patents is incorporated herein by this reference. In one embodiment, the depths of folding displacements 54 in structure 49 and reinforcing plate 47 are substantially equal. In one embodiment, the width of the folding displacements in structure 49 and reinforcing plate 47 are substantially equal. One skilled in the art will appreciate that the width and depth of the folding displacements and thickness of the sheets may vary depending on the application.

As described below, such an industrial arm may require mounting holes, particular bends, and the like that may interfere with the spacing and orientation of the folding displacements. Thus, the method described in U.S. application Ser. No. 10/931,615 referenced above may, among other things, be used to vary the position and orientation of each folding displacement to accommodate load-bearing junctions, bends, holes, mounting plates and similar structures in the sheets of material. Such variation has particular applicability to industrial arms and the like where the formed three-dimensional structure will be placed in operational configuration with other structures.

As the sheet of material is provided with folding displacements 54, the sheet of material may be precisely bent along bend line 53 in a manner that is described in great detail in Applicant's above-mentioned prior applications. Sheet 51 may be folded along the bend lines by hand or with the assistance of a grip, press, or similar conventional tools.

Figure 2:
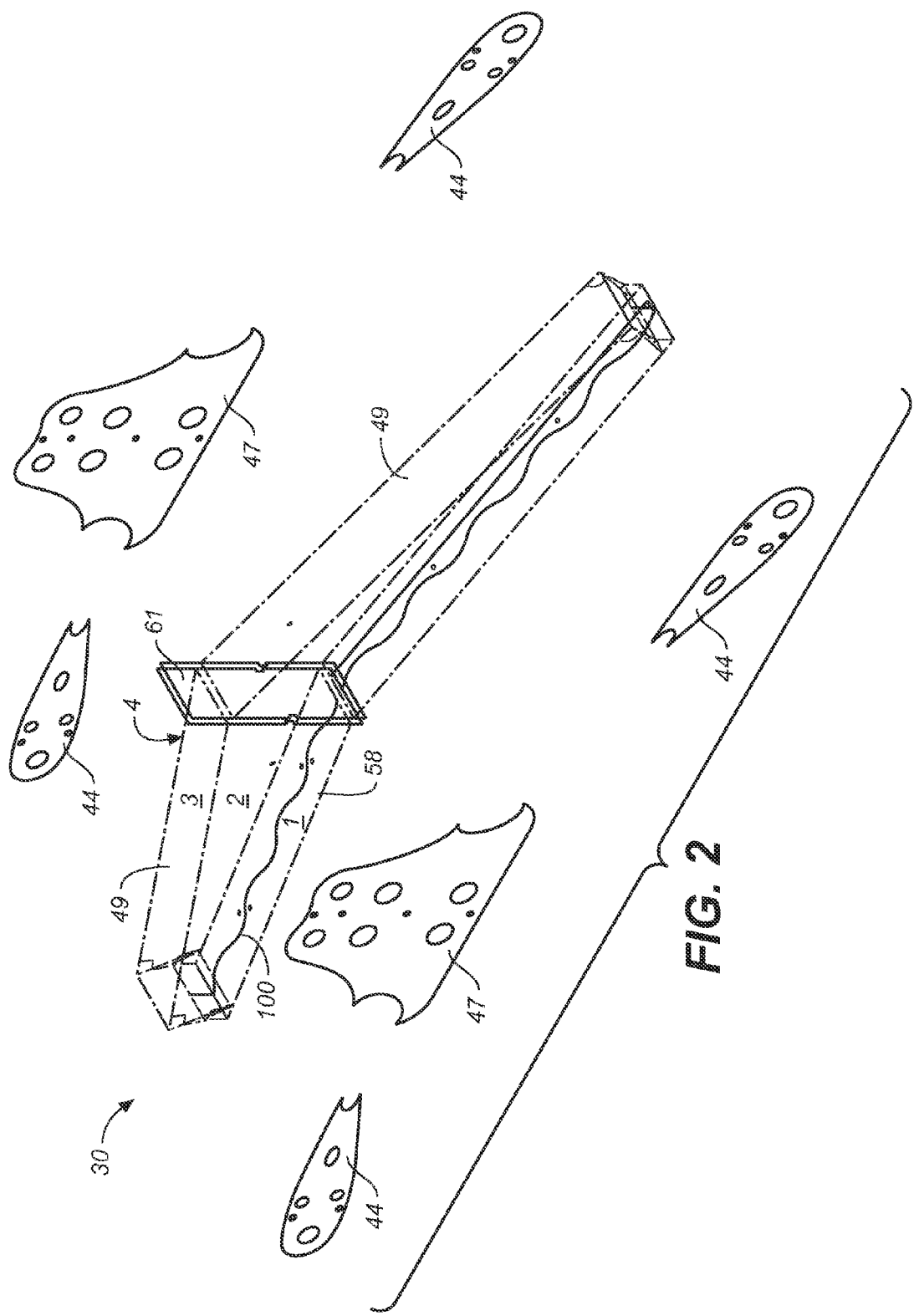
FIG. 2 is an exploded perspective view of the linkage arm of FIG. 1.
Figure 3:
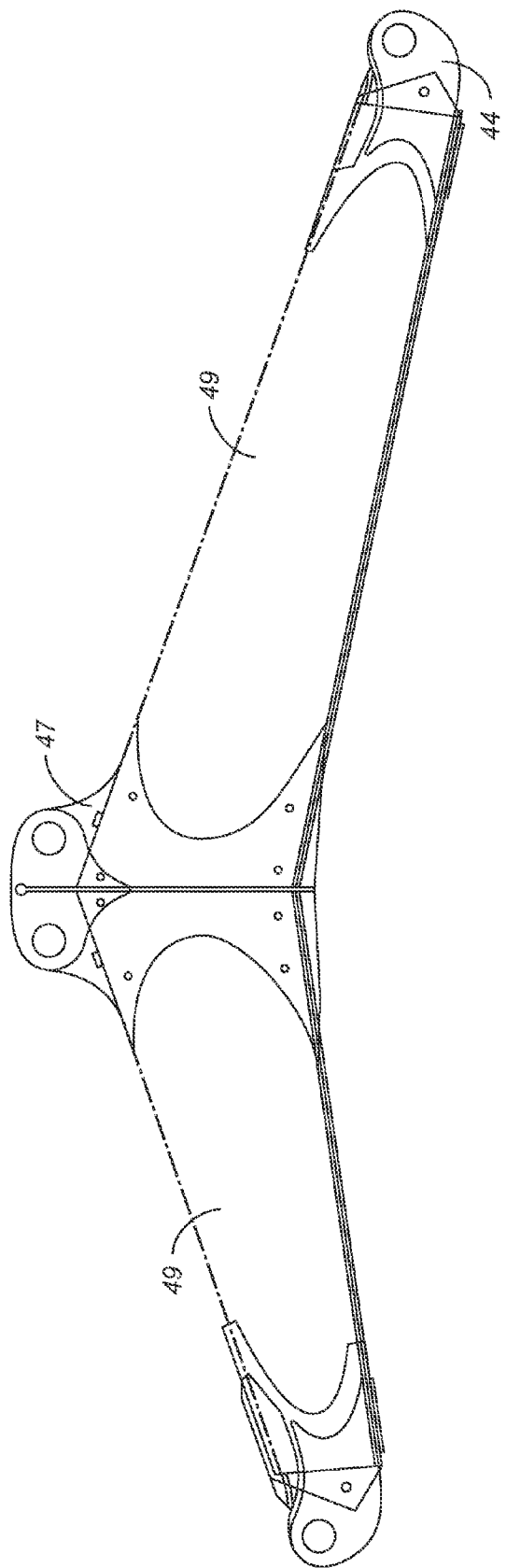
FIG. 3 is a side view of the linkage arm of FIG. 1.
Figure 5:
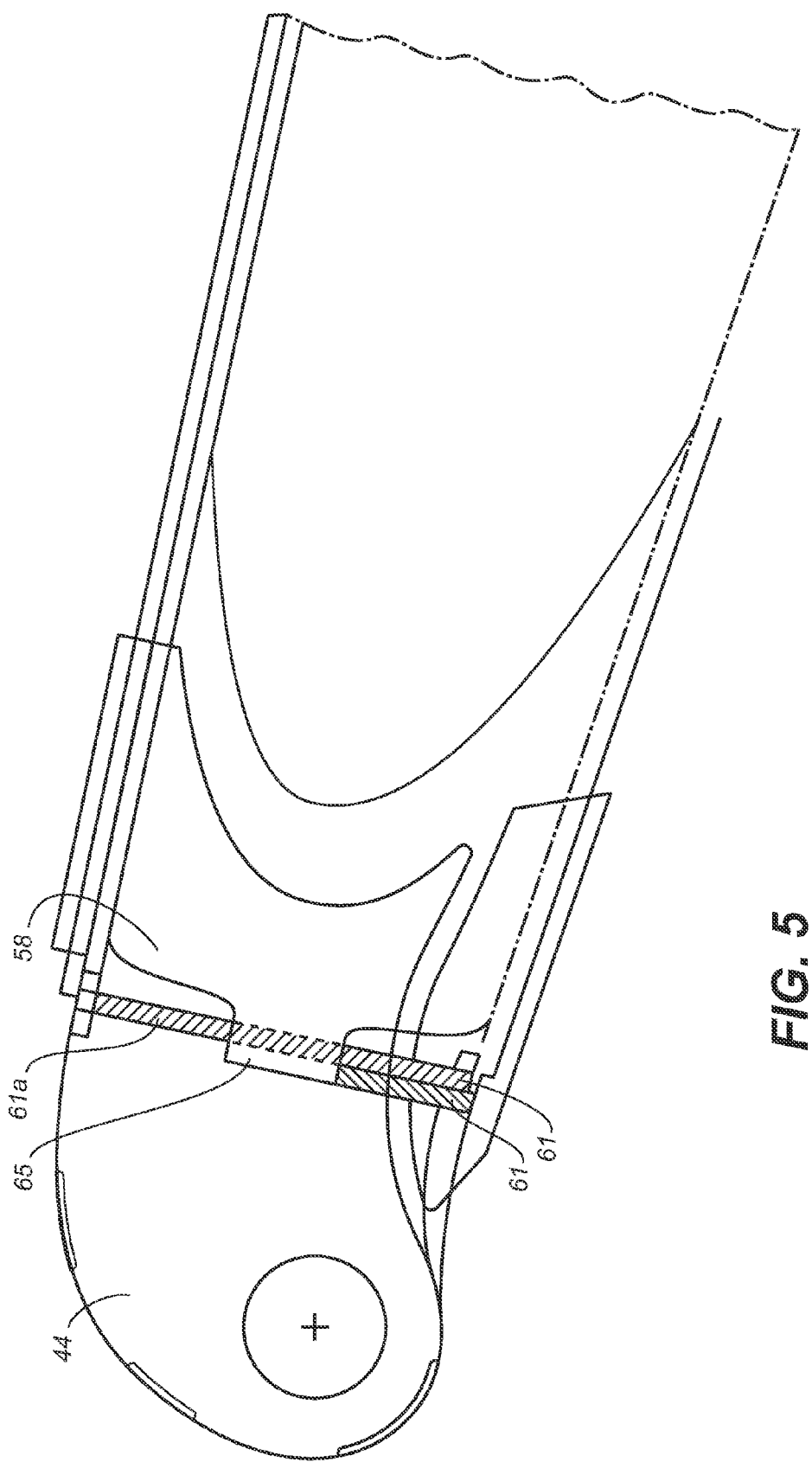
FIG. 5 is an enlarged side view of the pivot plates of FIG. 2.

As best seen in FIG. 5, front faces 60 fold up to provide additional reinforcement for pivot mounts 44. Front faces 60 abut optional tabs 65 and also partially close the end of the structure. As best seen in FIG. 2, back face 61 folds to provide an optional mounting face for structure 49 to a complementary three-dimensional structure.

Figure 12:
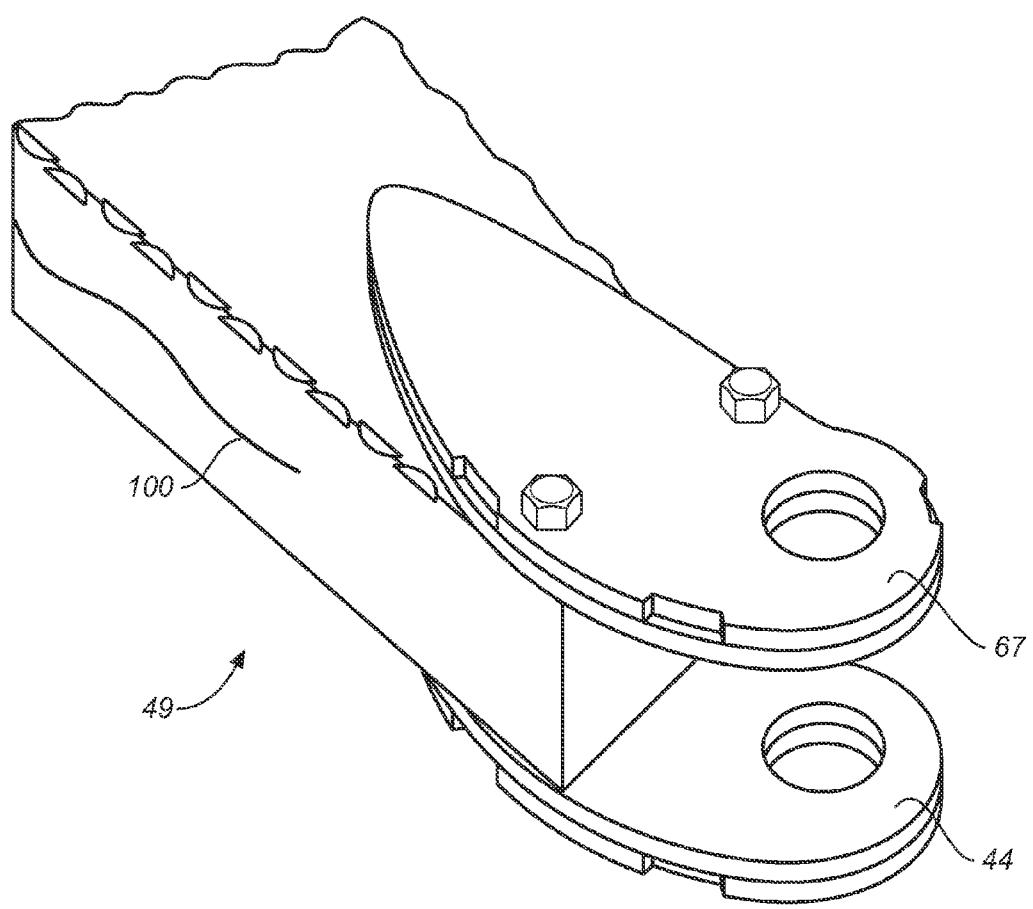
FIG. 12 is a perspective view of another embodiment of a three-dimensional structure in accordance with the present invention, the skeletal structure illustrated in conjunction with the support plates and pivot mounts of FIGS. 1-4 and 5.

In another embodiment, additional support plates 67 may optionally be provided at the ends of the three-dimensional structure to increase the strength of pivot mounts 44 (shown in FIG. 12). Such support plates may be necessary where the loads at the pivot ends of the three-dimensional structure are especially high.

When the sheet is folded into a three-dimensional structure, faces 56 form a box section. "Box section" shall mean a three-dimensional structure having a polygonal cross-section or a polyhedron. Thus, although the illustrated three-dimensional structure is shown with a rectangular box section, other shapes and cross-sections may be used in accordance with the present invention. The box section may also be formed with a large number of edges, curvilinear portions, or spherical portions. In one embodiment, the structure is formed by the folding along four bend lines formed by folding displacements 54. Alternatively, one or more of the bend lines may be preformed or formed by welding. The shape dimensions, and configuration of the box section will vary depending upon the application.

Once the faces are folded along the bend lines, flange section 58 encloses the box section and may be bonded to a first face by a weld or other known bonding or fastening methods. In one embodiment, an edge of flange section 58 has a wavy shape. In the case of welding or bonding, the wavy edge provides for dispersion of stress forces on structure 49 by reducing corners and straight edges. One will appreciate that other edge shapes may be used, including but not limited to, arcuate shapes or shapes for concentrating stress forces away from the weld. Additionally, the flange section and an opposite engaging face may be configured to interlock with each other or to fold together to form a flush surface.

At distal ends of three-dimensional structures 49, the pivot mounts fastened to opposite faces of the three-dimensional structures 49 provide location points for attachment to the machine body 35 or other linkage arms 42. The pivot mounts extend beyond ends of structure 49 and have bores dimensioned for insertion of a shaft or fastener therethrough. Similar to reinforcing plate 47, the pivot mounts are shaped for dispersion of stresses. The pivot mounts can be mounted to three-dimensional structures 49 by fasteners or other methods known in the art. Given the high loads exerted by the digging action on the pivot mounts, the pivot mounts are preferably greater than approximately 2" steel and may be thicker than 3". The thickness and dimensions of the pivot mounts will vary by application.

Figure 6:
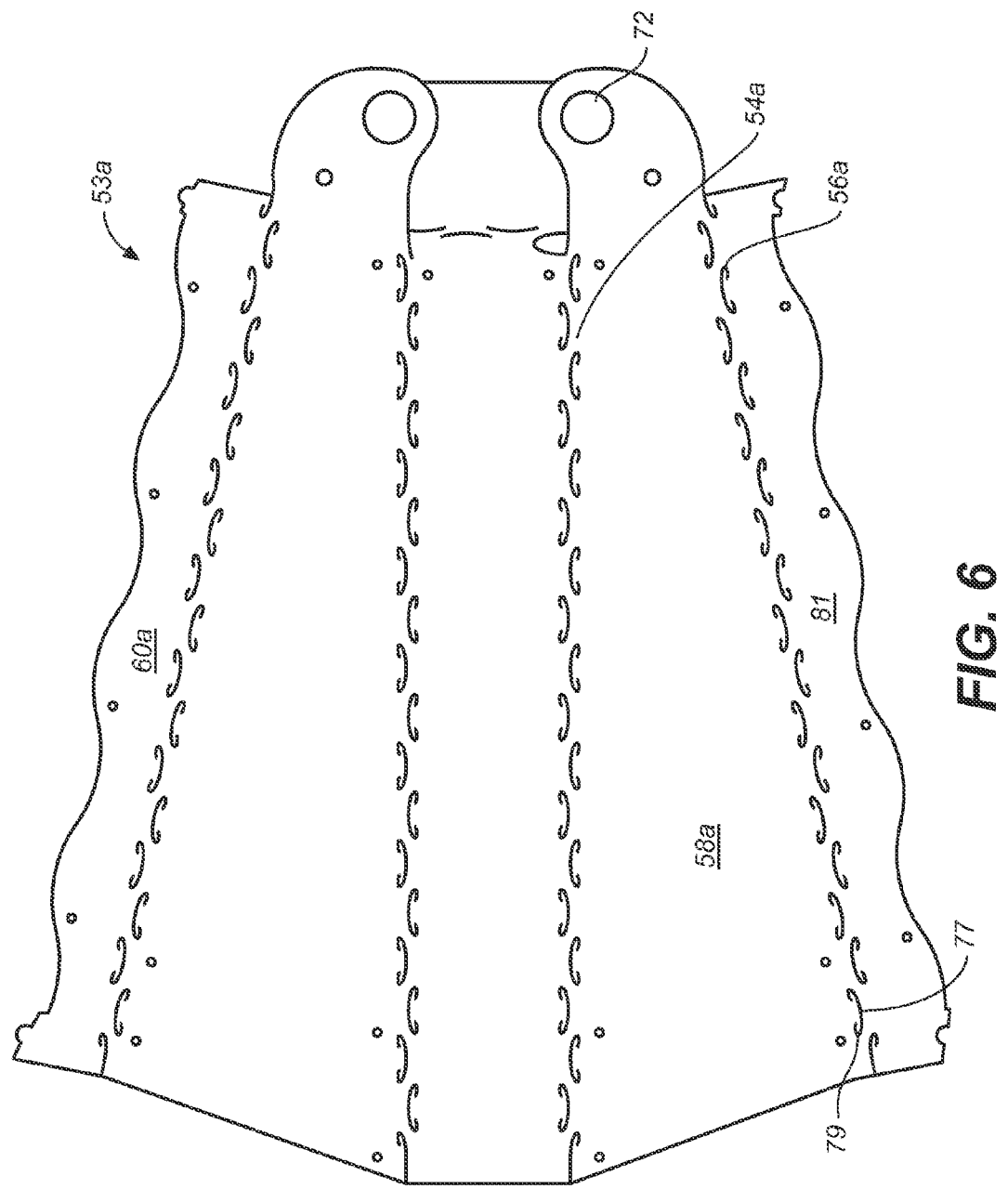
FIG. 6 is a top view of a skeletal structure in accordance with another embodiment of the present invention, the structure shown as a two-dimensional, unfolded sheet.
Figure 7:
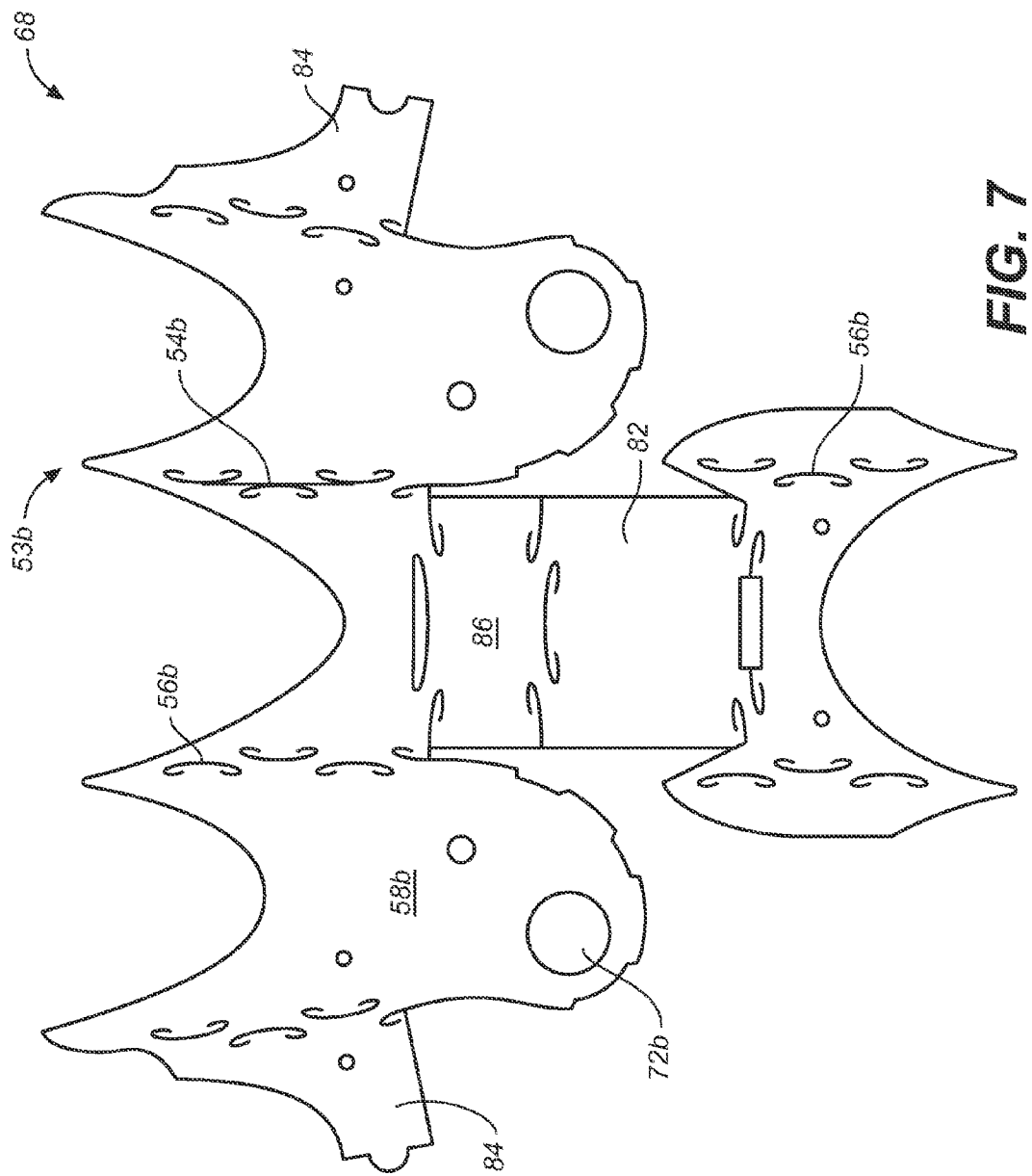
FIG. 7 is a top view of a reinforcing member in accordance with another embodiment of the present invention, the structure shown as a two-dimensional, unfolded sheet detached from the skeletal structure of FIG. 5.
Figure 8:
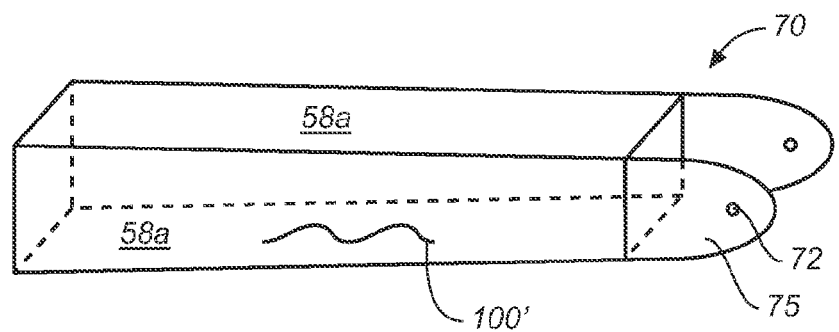
FIG. 8 is a perspective view of the skeletal structure of FIG. 6, the structure shown folded into three-dimensions.

Turning now to FIGS. 6-8, in another embodiment of the present invention, three-dimensional structure 49a is similar to three-dimensional structure 49 described above but includes reinforcing member 68 with integral pivot holes. Like reference numerals have been used to describe like components.

In one embodiment, the sheet material is 10-gauge sheet steel but other suitable thickness material may be used. One will appreciate that other sheet materials of different materials including other metals, composites, and plastics can be utilized in accordance with the present invention. For example, materials that may be used include, but are not limited to, stainless steel, aluminum, titanium, magnesium, and other suitable metals and alloys. The material type and thickness primarily depends on the specific application.

Turning to FIG. 6, a monolithic sheet of material 51a is shown. The sheet of material includes five planar segments, wherein each adjoining planar segment is separated by a respective bend line 53a populated by one or more folding displacements 54a. Upon folding the sheet of material, a skeletal structure 70 is formed wherein the planar segments form four faces 56a and a flange section 58a. One will appreciate that three, four, five or more planar segments may be provided depending upon the desired overall geometry of the resulting three-dimensional structure.

In contrast to the first embodiment, pivot holes 72 are integrally formed with sheet of material 51a. As best seen in FIG. 8, when the sheet material is in a folded configuration, a box-section 74 is formed. Extending portions 75, which oppose each other, have additional face length such that concentric pivot holes 72 lie beyond the box-section. This extending portion of the faces having pivot holes 72 serve a similar function to pivot mounts 44.

In one embodiment the folding displacements are slits; however, one will appreciate that any of the folding displacements and bend-controlling elements disclosed in the above-mentioned applications and other suitable means may be utilized. Folding displacements 54a and other bend-controlling structures may be formed by various processes including stamping, punching, cutting, roll forming, embossing, and other suitable means.

As sheet of material 51 is provided with folding displacements 54a, the sheet of material may be precisely bent along bend line 53a in a manner that is described in great detail in Applicant's above-mentioned prior applications. In one embodiment, the folding displacements each have a central portion 77 substantially parallel to and laterally offset from bend line 53a. End portions 79 of the central portion extend away from the bend line in an arcuate shape.

A first face 81 of the sheet of material is configured to engage with a flange section 58a in a folded position. As best seen in FIG. 8, the first face and flange section have complementary edge shapes such that they form a flush face on the bottom of the three-dimensional structure. Spot welds or other fastening methods bond the faces together and lock the three-dimensional structure. The non-linear shape of the engagement-region serves to disperse stress forces between flange section 58a and first face 81.

Turning now to FIGS. 7-8, a reinforcing member 68 is shown as a monolithic sheet of material. In one embodiment, the reinforcing member is the same material as the skeletal structure. One will appreciate, however, that other suitable materials may be utilized including, but not limited to, metals, plastics, composites, and alloys.

Similar to skeletal structure 70, in one embodiment folding displacements 54b of reinforcing member 68 are slits; however, one will appreciate that other suitable means may be utilized. In the illustration, the reinforcing member additionally includes alternatively-shaped folding displacements in a neck region 82.

As the sheet of material 51b is provided with folding displacements 54b, the sheet of material may be precisely bent along bend lines 53b in a manner that is described in great detail in Applicant's above-mentioned prior applications. In the illustration, the reinforcing member has two end portions 84 configured for mutual engagement. The faces 56b with pivot holes 72b fold to the sides of a central face 86, and the end portions engage each other to form a bottom face. Neck region 82 folds around an end of the structure thereby sealing off the end and adding to the overall structural integrity of the member.

When the reinforcing member is folded, a spot weld or other bonding method secures the two end portions and locks the structure. One will appreciate that other configurations may be used including, but not limited to, key-and-hole shapes for locking the member without the use of welding or adhesives. FIG. 8 depicts reinforcing member 68 in a folded, three-dimensional shape.

Figure 9:
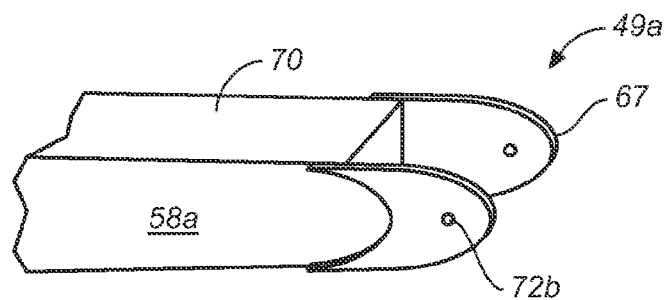
FIG. 9 is a perspective view of the three-dimensional structure of FIG. 5, the reinforcing member of FIG. 7 shown around the skeletal structure of FIG. 6.

As shown in FIG. 9, the folded reinforcing member 68 is subsequently placed over skeletal structure 70. The reinforcing member includes a pair of pivot holes 72b configured to align with pivot holes 72 when the reinforcing member is wrapped around skeletal structure 70, thus reinforcing the pivot connection of the three-dimensional structure 49. In the illustration, the number of bend lines and resulting corners in the three-dimensional reinforcing member correspond to the number of corners of skeletal structure 70 such that the reinforcing member fits the skeletal structure. In this configuration, the reinforcing member substantially reinforces the outer shape of the skeletal structure. One will appreciate, however, that other cross-sectional shapes may be utilized including, but not limited to, rounded or arcuate shapes, polygons, and star shapes. Moreover, the three-dimensional geometries of the skeletal structure and reinforcing member may be different. For example, the skeletal structure can be a box section and the reinforcing member a cylinder having a diameter substantially equal to the diagonal width of the skeletal structure. A portion of an inner surface of the reinforcing member generally should contact a portion of the exterior surface of the skeletal structure.

In the illustration, reinforcing member 68 is positioned over an end of the skeletal structure. In this position, the reinforcing member acts similar to support plate 67 and also provides greater structural integrity to the entire distal region of the skeletal structure where the load force is being applied. One will appreciate that the reinforcement member may have other geometries and positions including, but not limited to, fully covering the skeletal structure or a band shape wrapping the junction region of two structures.

The addition of the reinforcing member enhances the structural integrity of the assembled three-dimensional structure 49a sufficient to support loads typical of heavy-manufacturing and industrial applications. Further, it has been found that use of wrapping reinforcing members, reinforcing plates, and the like allow for a structure with high load capacity and economical material use. The reinforcing member increases the structures resistance to torquing, wobbling, skewing, sagging, and collapse under loading.

Figure 10A:
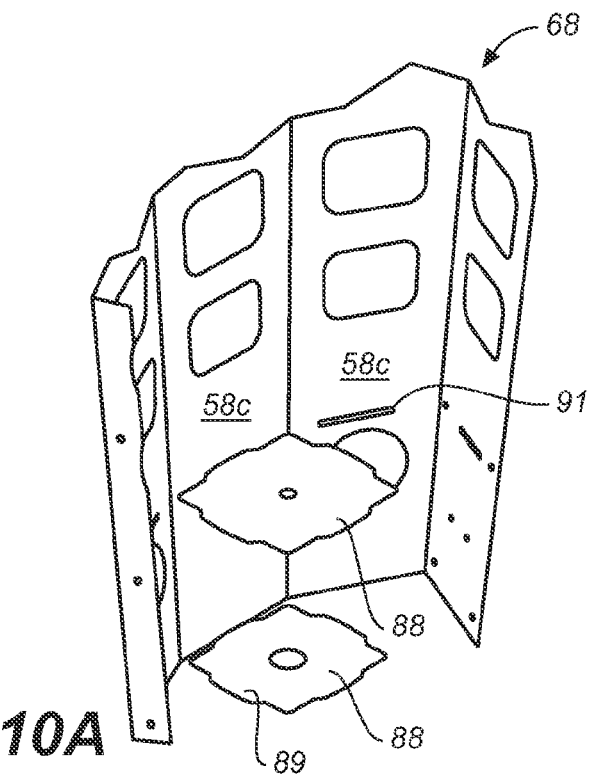
FIGS. 10A-10C are perspective views of skeletal structures, optional gussets, and a reinforcing member in conjunction with a linkage arm similar to that of FIG. 1 in accordance with the present invention.
Figure 11:
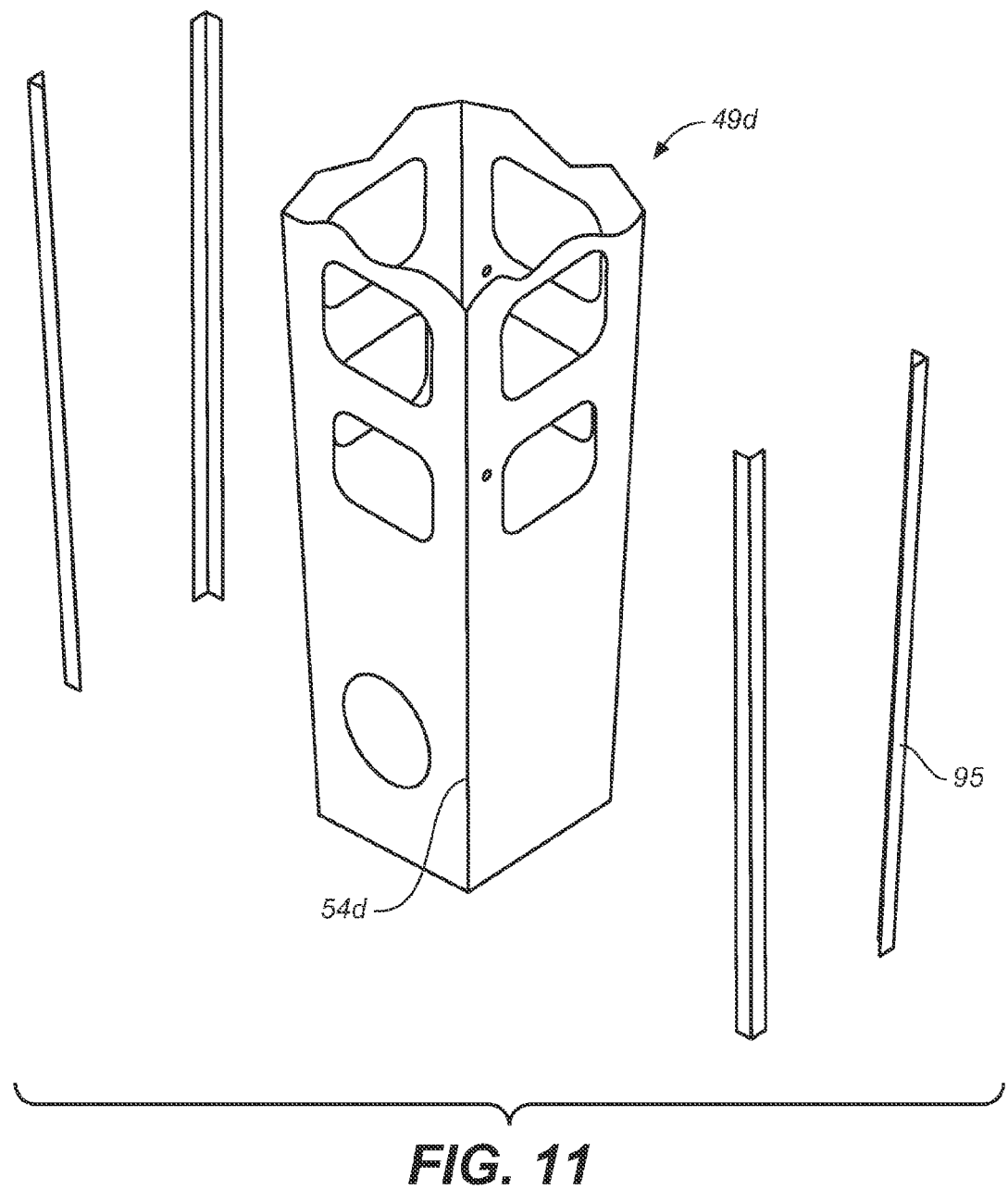
FIG. 11 is a perspective view of optional shin members in conjunction with a linkage arm similar to that of FIG. 1 in accordance with the present invention.

As shown in FIG. 10A, a gusset 88 can optionally be folded in skeletal structure 70 and/or reinforcing member 68. The faces 56c of either structure fold around gusset 88. The gusset includes tongues 89 along peripheral edges, and the faces 56c include grooves 91. The tongues and grooves correspond to each other such that gusset 88 locks into place when the structure is folded. The gusset provides additional strength to the structure inside of which it is wrapped, especially in resisting torsional forces and wobbling.

Figure 10B:
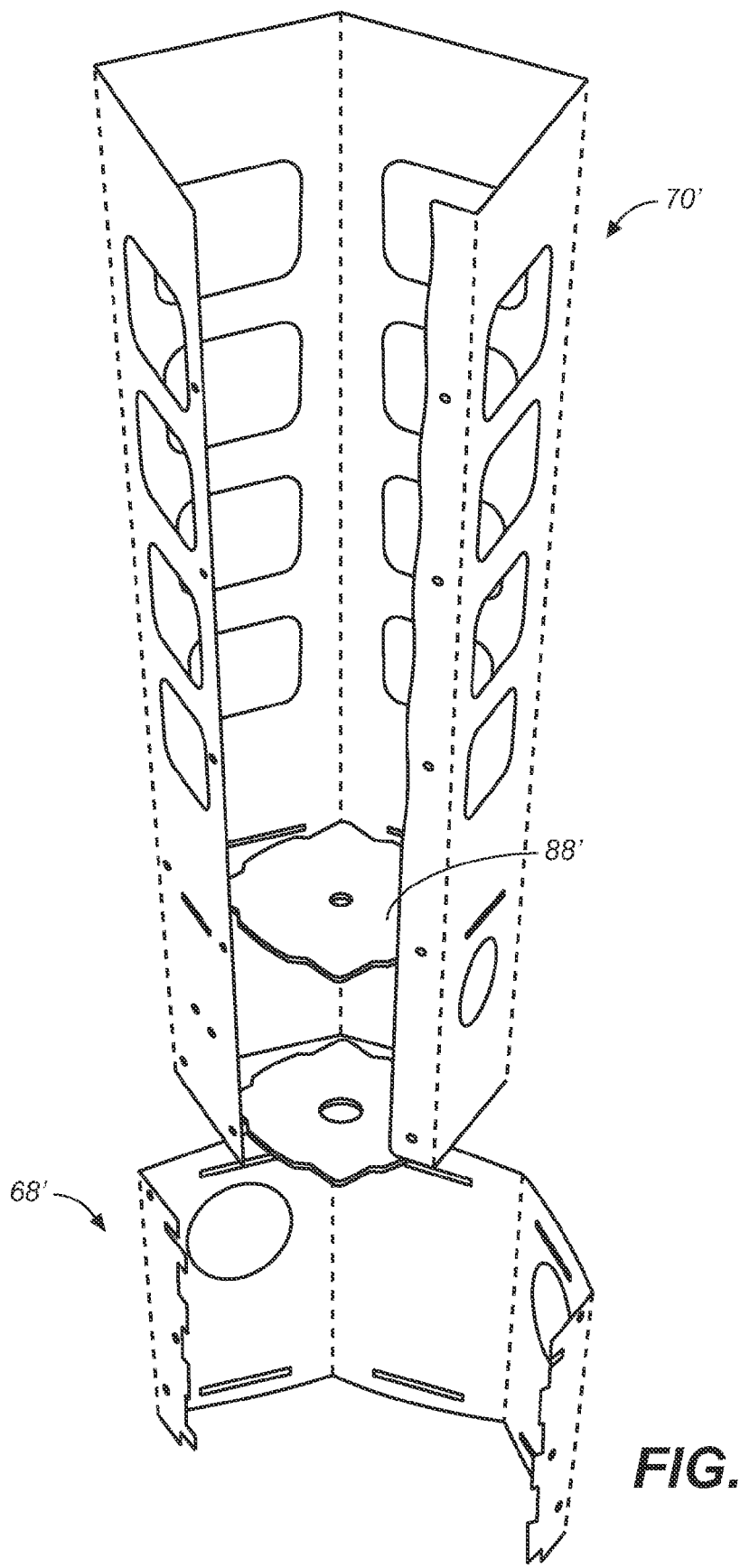
Figure 10C:
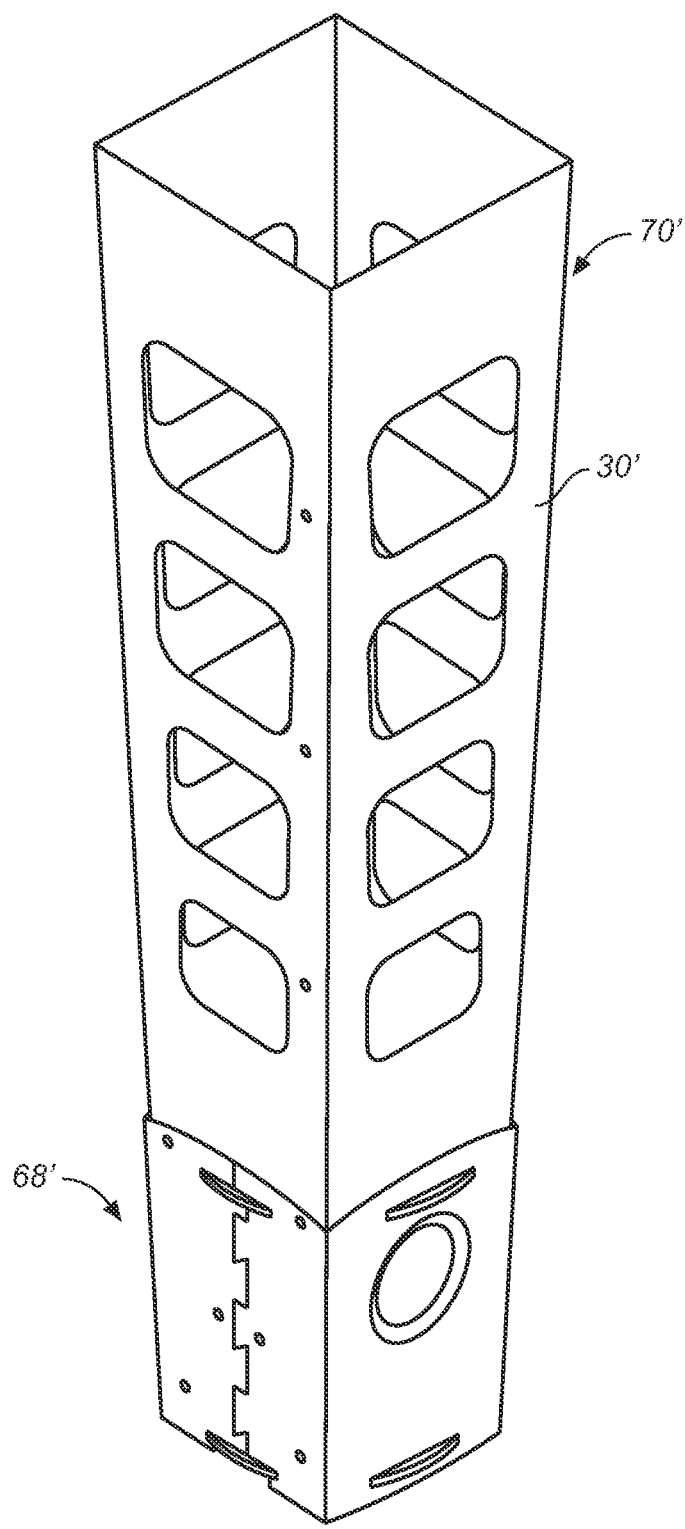

As shown in FIGS. 10B-10C, a gusset 93' may also be optionally folded in a skeletal structure 70' which is wrapped with a reinforcing member 68'. Reinforcing member 68' wraps skeletal structure 70' in the same manner as that of reinforcing member 68 and skeletal structure 70 described above and shown in FIGS. 6-7. In one embodiment, at least one gusset is configured as an end cap of a linkage arm. The combination of gussets and at least one reinforcing member provides significant improvements in the physical properties of the resulting three-dimensional structure. One will appreciate from the foregoing that other members and configurations may be employed to increase the strength and utility of the structure.

Turning now to operation and use, three-dimensional structure 49 is folded from a two-dimensional sheet into a three-dimensional geometry and fastened with a single weld or other bonding method. Additional members may then be applied as necessary depending on the application. When used as a machinery component, the resulting structure can then be inserted as a replacement part on-site. In the alternative, when used in new machine assembly, the part can be assembled directly and added to the machine assembly in-line.

One will appreciate that the present invention can be used for any number of applications including, but not limited to, building engineering, civil engineering, and machinery components. The three-dimensional structure can be used as a load beam, component part, or other industrial part. Although the present invention has particular strength characteristics advantageous for high-load applications, it is foreseeable that the present invention can be used in other sheet-folding applications. For example, the present invention can be used to maintain structural integrity while decreasing overall material usage of enclosures, boxes, and the like.

In industrial applications, shin members 95 are optionally provided at corners of the three-dimensional structure 49d as shown in FIG. 11. In applications where the structure may be abraded, bumped, or otherwise subjected to contact, shin members 95 provide protection for the folding displacements 54d on the bended corners of the structure. One will appreciate from the foregoing that other protective measures may be utilized to protect the folding displacements.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A load-bearing structure comprising:
   a three dimensional structure formed from a sheet of material having a plurality of bend lines, each bend line including a plurality of folding displacements, slits, or displacements and slits, the sheet of material bent along its bend lines into a box-section;
   a reinforcing member formed by a sheet of material having a plurality of bend lines, each bend line including a plurality of folding displacements, slits, or displacements and slits, the reinforcing member configured for substantially surrounding a portion of the three dimensional structure to reinforce the structural integrity of the three dimensional structure; and
   a gusset having peripheral tongue members, the gusset being configured to be wrapped along a peripheral edge by the three dimensional structure, wherein the three-dimensional structure includes grooves for receiving the tongue members, an inner surface of the reinforcing member contacts an exterior surface of the three dimensional structure, the reinforcing member substantially reinforces an outer shape of the three-dimensional structure, bend lines of the reinforcing member correspond to corners of the three-dimensional structure such that the reinforcing member fits the three-dimensional structure, and the sheet of material from which the reinforcing member is formed is bent along its bend lines to form a box section.

2. A load-bearing structure comprising:

a three dimensional structure formed from a sheet of material having a plurality of bend lines, each bend line including a plurality of folding displacements, slits, or displacements and slits, the sheet of material bent along its bend lines into a box-section;

a reinforcing member formed by a sheet of material having a plurality of bend lines, each bend line including a plurality of folding displacements, slits, or displacements and slits, the reinforcing member configured for substantially surrounding a portion of the three dimensional structure to reinforce the structural integrity of the three dimensional structure; and a gusset having peripheral tongue members, the gusset being configured to be wrapped along a peripheral edge by the three dimensional structure, wherein the three-dimensional structure includes grooves for receiving the tongue members and wherein the sheet of material from which the reinforcing member is formed is bent along its bend lines to form a box section.

3. A load-bearing structure comprising:

a three dimensional structure formed from a sheet of material having a plurality of bend lines, each bend line including a plurality of folding displacements, slits, or displacements and slits, the sheet of material bent along its bend lines into a box-section;

a reinforcing member formed by a sheet of material having a plurality of bend lines, each bend line including a plurality of folding displacements, slits, or displacements and slits, the reinforcing member configured for substantially surrounding a portion of the three dimensional structure to reinforce the structural integrity of the three dimensional structure; and a gusset having peripheral tongue members, the gusset being configured to be wrapped along a peripheral edge by the three dimensional structure, wherein the three-dimensional structure includes grooves for receiving the tongue members.

4. The load bearing structure of claim 2, wherein an inner surface of the reinforcing member contacts an exterior surface of the three dimensional structure.

5. The load bearing structure of claim 2, wherein the reinforcing member substantially reinforces an outer shape of the three-dimensional structure.

6. The load bearing structure of claim 2, wherein bend lines of the reinforcing member correspond to corners of the three-dimensional structure such that the reinforcing member fits the three-dimensional structure.

7. The load bearing structure of claim 3, wherein an inner surface of the reinforcing member contacts an exterior surface of the three dimensional structure.

8. The load bearing structure of claim 3, wherein the reinforcing member substantially reinforces an outer shape of the three-dimensional structure.

9. The load bearing structure of claim 3, wherein bend lines of the reinforcing member correspond to corners of the three-dimensional structure such that the reinforcing member fits the three-dimensional structure.

* * * * *